United States Patent
Khan et al.

(10) Patent No.: US 7,814,020 B2
(45) Date of Patent: Oct. 12, 2010

(54) SYSTEM, METHOD AND COMPUTER PROGRAM PRODUCT FOR THE RECORDING AND PLAYBACK OF TRANSACTION MACROS

(75) Inventors: Umair A. Khan, Fremont, CA (US); Wasiq M. Bokhari, Fremont, CA (US); Dmitriy V. Yepishin, Fremont, CA (US); Asad A. Zaidi, Newark, CA (US); Salman Akhtar, Fremont, CA (US); Quinton Y. Zondervan, Boston, MA (US)

(73) Assignee: NVIDIA International, Inc., St. Michael (BB)

( * ) Notice: Subject to any disclaimer, the term of this patent is extended or adjusted under 35 U.S.C. 154(b) by 1474 days.

(21) Appl. No.: 09/942,047

(22) Filed: Aug. 28, 2001

(65) Prior Publication Data

US 2002/0152159 A1   Oct. 17, 2002

Related U.S. Application Data

(60) Provisional application No. 60/283,781, filed on Apr. 12, 2001.

(51) Int. Cl.
 *G06F 21/00* (2006.01)
 *G06Q 20/00* (2006.01)
(52) U.S. Cl. .............................. 705/51; 705/50; 705/59; 705/65; 705/67; 705/76; 705/16; 705/18; 705/901; 705/902; 705/911
(58) Field of Classification Search ............... 705/39
 See application file for complete search history.

(56) References Cited

U.S. PATENT DOCUMENTS

| | | | |
|---|---|---|---|
| 4,914,568 A | 4/1990 | Kodosky et al. ............ 715/763 |
| 5,321,838 A | 6/1994 | Hensley et al. ............. 395/700 |
| 5,485,460 A | 1/1996 | Schrier et al. ............. 370/94.1 |
| 5,717,860 A | 2/1998 | Graber et al. .......... 395/200.12 |
| 5,748,499 A | 5/1998 | Trueblood ............. 364/551.01 |
| 5,960,411 A * | 9/1999 | Hartman et al. ............... 705/26 |
| 5,963,924 A | 10/1999 | Williams et al. ............. 705/40 |
| 5,966,126 A | 10/1999 | Szabo ........................ 715/762 |
| 6,016,504 A * | 1/2000 | Arnold et al. ............... 709/200 |
| 6,034,963 A | 3/2000 | Minami et al. ............. 370/401 |
| 6,052,120 A | 4/2000 | Nahi et al. .................. 345/326 |
| 6,067,559 A | 5/2000 | Allard et al. ................ 709/202 |
| 6,084,584 A | 7/2000 | Nahi et al. .................. 345/329 |
| 6,166,734 A | 12/2000 | Nahi et al. .................. 345/335 |
| 6,185,585 B1 | 2/2001 | Sequeira ..................... 707/513 |
| 6,199,051 B1 | 3/2001 | Gifford ........................ 705/75 |
| 6,278,966 B1 * | 8/2001 | Howard et al. ................ 703/23 |
| 6,418,471 B1 * | 7/2002 | Shelton et al. .............. 709/227 |

(Continued)

OTHER PUBLICATIONS

Konopnicki et al., "Information Gathering in the World Wide Web: The W3QL Query Language and the W3QS System" ACM Transactions on Database Systems, vol. 23, No. 4, Dec. 1998, pp. 369-410.

Office Action Summary from U.S. Appl. No. 10/318,504 which was mailed on Oct. 20, 2006.

Office Action Summary from U.S. Appl. No. 10/318,504 which was mailed on May 3, 2006.

(Continued)

*Primary Examiner*—Andrew J. Fischer
*Assistant Examiner*—Joshua Murdough
(74) *Attorney, Agent, or Firm*—Zilka-Kotab, PC

(57) ABSTRACT

A system, method and computer program product are provided for carrying out a transaction. Initially, a transaction pattern reflecting a transaction is stored in memory. Thereafter, the transaction pattern is executed to carry out the transaction in an automated manner.

35 Claims, 23 Drawing Sheets

U.S. PATENT DOCUMENTS

| | | | |
|---|---|---|---|
| 6,466,971 B1 | 10/2002 | Humpleman et al. | 709/220 |
| 6,631,345 B1 | 10/2003 | Schumacher et al. | 703/22 |
| 6,684,385 B1 | 1/2004 | Bailey et al. | 717/109 |
| 6,707,474 B1 | 3/2004 | Beck et al. | 715/771 |
| 6,757,900 B1 | 6/2004 | Burd et al. | 719/316 |
| 6,868,292 B2 | 3/2005 | Ficco et al. | 700/19 |
| 7,185,286 B2 | 2/2007 | Zondervan et al. | 715/762 |
| 7,647,561 B2 | 1/2010 | Zondervan et al. | 715/762 |
| 2001/0011284 A1 | 8/2001 | Humpleman et al. | 707/511 |
| 2001/0021925 A1* | 9/2001 | Ukigawa et al. | 705/39 |
| 2002/0016754 A1* | 2/2002 | Khan et al. | 705/35 |
| 2002/0059073 A1 | 5/2002 | Zondervan et al. | 704/270.1 |
| 2002/0069164 A1* | 6/2002 | Adam et al. | 705/40 |
| 2002/0077973 A1* | 6/2002 | Ronchi et al. | 705/39 |
| 2002/0152159 A1 | 10/2002 | Khan et al. | 705/39 |
| 2002/0188910 A1 | 12/2002 | Zizzo | 716/1 |
| 2003/0013492 A1 | 1/2003 | Bokhari et al. | 455/566 |
| 2003/0050931 A1 | 3/2003 | Harman et al. | 707/100 |
| 2003/0051059 A1 | 3/2003 | Zondervan et al. | 709/250 |
| 2003/0080994 A1 | 5/2003 | Yepishin et al. | 345/738 |
| 2003/0115572 A1 | 6/2003 | Zondervan et al. | 717/109 |
| 2003/0120762 A1 | 6/2003 | Yepishin et al. | 709/223 |
| 2004/0205454 A1 | 10/2004 | Gansky et al. | 715/500 |
| 2008/0016157 A1* | 1/2008 | Sahraie et al. | 709/205 |

OTHER PUBLICATIONS

International Search Report from PCT Application No. PCT/US02/11559 mailed on Sep. 16, 2002.

International Preliminary Report from PCT Application No. PCT/US02/11559 mailed on Apr. 11, 2003.

Konopnicki et al., "Information Gathering in the World Wide Web: The W3Wl Query Language and the W3Qs System", ACM Transactions, Dec. 1998, pp. 369-410.

Notice of Allowance from U.S. Appl. No. 09/953,372 mailed on Nov. 17, 2006.

Office Action Summary from U.S. Appl. No. 09/953,372 mailed on Jun. 8, 2006.

Advisory Action from U.S. Appl. No. 09/953,372 mailed on Mar. 3, 2006.

Final Office Action Summary from U.S. Appl. No. 09/953,372 mailed on Dec. 21, 2005.

Office Action Summary from U.S. Appl. No. 09/953,372 mailed on Jun. 15, 2005.

Office Action Summary from U.S. Appl. No. 09/953,372 mailed on Mar. 22, 2005.

Decision on Appeal from U.S. Appl. No. 10/318,504 mailed on Mar. 3, 2009.

Examiner's Answer from U.S. Appl. No. 10/318,504 mailed on Aug. 10, 2007.

Advisory Action from U.S. Appl. No. 10/318,504 mailed on Jan. 23, 2007.

Notice of Allowance from U.S. Appl. No. 10/318,504 mailed on Jul. 21, 2009.

\* cited by examiner

SYSTEM, METHOD AND COMPUTER PROGRAM PRODUCT FOR THE RECORDING AND PLAYBACK OF TRANSACTION MACROS

This application claims the benefit of U.S. Provisional Application No. 60/283,781 filed on Apr. 12, 2001, the disclosure of which is incorporated herein by reference.

FIELD OF THE INVENTION

The present invention relates to computer-related transactions, and more particularly to automating computer-related transactions.

BACKGROUND OF THE INVENTION

The Internet is composed of content distributed in the World Wide Web and various intranets. While a large fraction of the content is static, the truly interesting content is the one that a user can interact with dynamically. This content is of various types including, but not limited to (i) the content stored in various databases, (ii) e-commerce web-pages, (iii) directories, (iv) intranet pages, and/or (v) data warehouses, etc.

The interaction with this dynamic content is accomplished through (i) queries/submissions to databases, (ii) buying/selling/interacting through e-commerce, (iii) running queries and lookups in directories, (iv) accessing and interacting with content resident on intranet pages (including on individual computers), and/or (v) accessing, interacting with, adding, subtracting or modifying content resident in data warehouses.

The access to or interaction with this dynamic content is done in a variety of ways. For example, such interaction may be accomplished through direct access to the databases by running specific commands or through form submissions on the Internet that run specific queries or perform specific actions. This interaction requires the submission of necessary parameters or information to complete a query or interaction (addition, modification, subtraction) with the dynamic content. This information may need to be submitted in multiple steps. Once the submission of information is finished, the results of the interaction/query/e-commerce are sent back to the user.

Each time a user wishes to interact in the foregoing manner, the user is required to carry out each and every one of the steps associated with the submission of necessary parameters or information. If a same type of transaction is to be carried out in a repeated manner, this may be very time consuming and problematic.

Therefore, there is a need for a technique involving automated execution of transactions of various types, no matter the complexity thereof.

SUMMARY OF THE INVENTION

A system, method and computer program product are provided for carrying out a transaction. Initially, a transaction pattern reflecting a transaction is stored in memory. Thereafter, the transaction pattern is executed to carry out the transaction in an automated manner.

In one embodiment of the present invention, the transaction pattern may include a record of: information submitted by a user, actions taken by the user, actions taken by a system to generate results, and results sent to the user. As an option, the transaction pattern may include a record of actions taken by the system which enable access of the user to data, and actions enabled by the data to retrieve content.

In another embodiment of the present invention, the storage of the transaction pattern may includes the storage of records relating to: (1) an interface presented to a user; (2) submission of information by a user; (3) parameters required to complete the transaction; (4) navigation of a user during the transaction; (5) information returned by a system; and/or (6) information selected by a user.

In still another embodiment of the present invention, the execution of the transaction pattern may include: (1) retrieval of the transaction pattern by an automated and/or programmable agent; (2) submission of required parameters during the transaction; (3) automatic navigation during the transaction; (4) retrieval of content; and/or (5) relaying content to a user.

DESCRIPTION OF THE PREFERRED EMBODIMENTS

Figure 1:
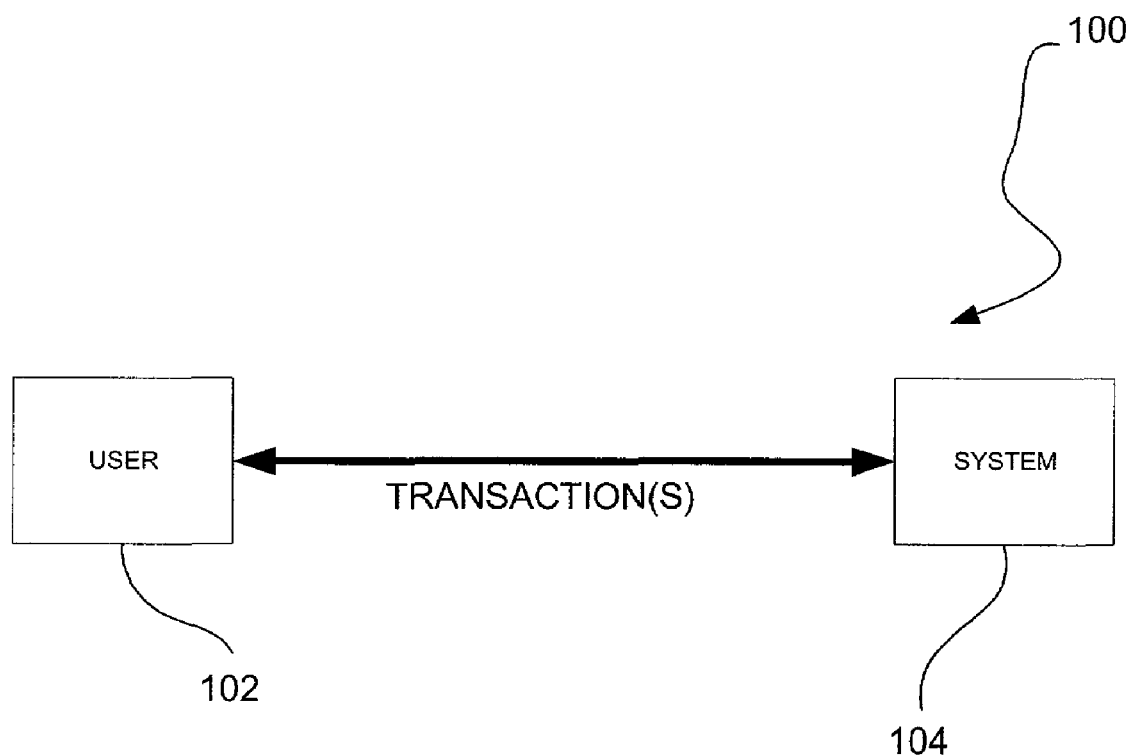
FIG. 1 illustrates a system including a user and a system, in accordance with one embodiment of the present invention.

FIG. 1 illustrates a system 100 including a user 102 and a system 104, in accordance with one embodiment of the present invention. During use, the user 102 and the system 104 interact during transactions. In the present invention, a transaction refers to communicating (i) information and/or actions required to conduct the transaction, and/or (ii) information and/or actions sent back or desired by the user, respectively.

For example, a transaction, in one embodiment, may refer to: information submitted by the user, actions taken by the user, actions taken by a system enabling the access of the user to the data, actions taken by the data to retrieve/modify content, results sent back to the user, and/or any combination or portion of the foregoing entities.

Figure 2:
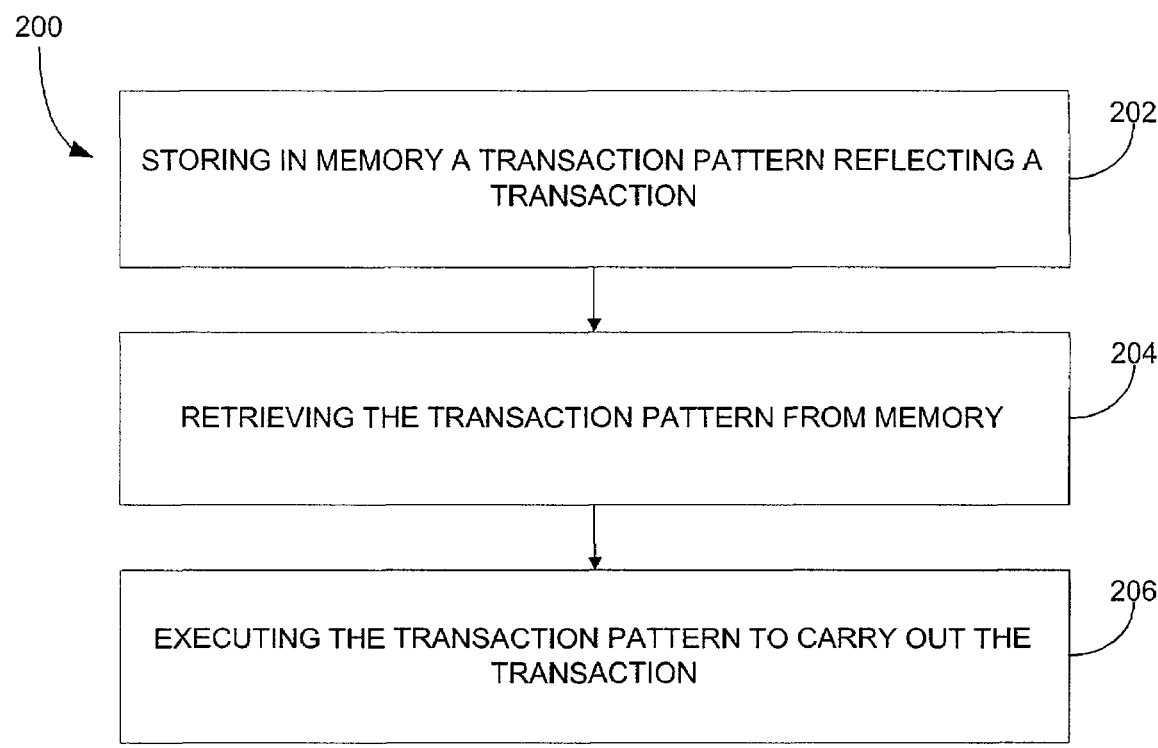
FIG. 2 illustrates a method for carrying out a computer-implemented transaction.

FIG. 2 illustrates a method 200 for carrying out a computer-implemented transaction. Initially, in operation 102 a transaction pattern reflecting a transaction is stored in memory. This may be carried out while the transaction is happening.

In one embodiment of the present invention, the transaction pattern may include a record of: information submitted by a user, actions taken by the user, actions taken by a system to generate results, and results sent to the user. As an option, the transaction pattern may include a record of actions taken by the system which enable access of the user to data, and actions enabled by the data to retrieve content. Storage in accordance with operation 102 may take any form with sufficient identification and description of any required step in the transaction process.

Figure 2A:
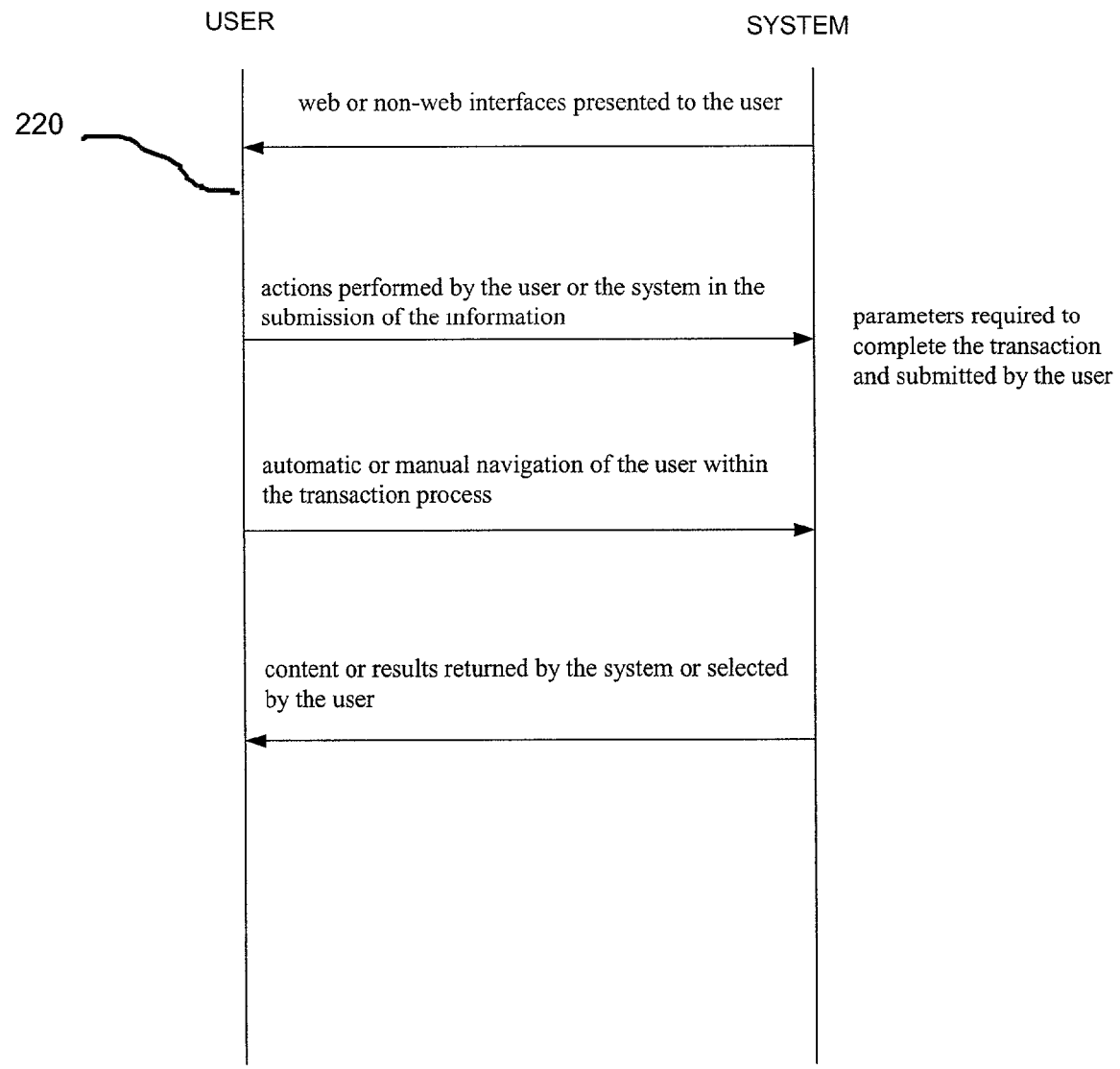
FIG. 2A illustrates an exemplary flow diagram showing information that may be stored with the transaction pattern.

FIG. 2A illustrates an exemplary flow diagram 220 illustrating the various information which may be stored during operation 102 of FIG. 2. For example, such information may involve (i) the web or non-web interfaces presented to the user, (ii) the actions performed by the user or the system in the submission of the information, (iii) the parameters required to complete the transaction and submitted by the user, (iv) the automatic or manual navigation of the user within the transaction process, and/or (v) the content or results returned by the system or selected by the user.

During use of the present invention, such transaction pattern may be retrieved from memory when desired in operation 104. Thereafter, the transaction pattern is executed to carry out the transaction in an automated manner. Note operation 106. An execution, or playback, in accordance with operation 106 may include the invocation of a stored transaction pattern.

Figure 2B:
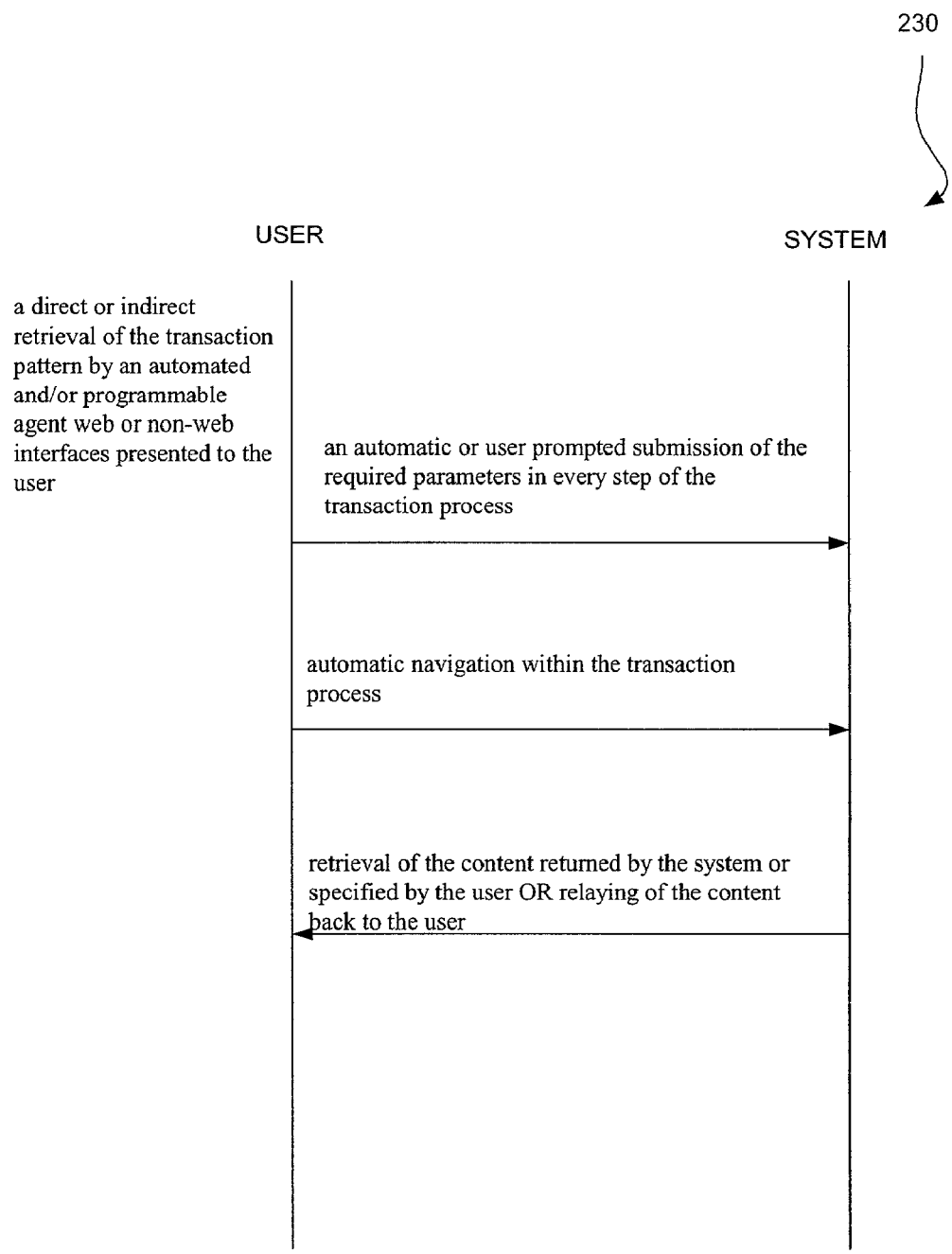
FIG. 2B illustrates an exemplary flow diagram showing the manner in which a transaction pattern may be executed.

FIG. 2B illustrates an exemplary flow diagram 230 illustrating the various operations that may occur during execution of a transaction pattern in accordance with operation 106 of FIG. 2. Such may involve: (i) a direct or indirect retrieval of the transaction pattern by an automated and/or programmable agent, i.e. a computer server/client, an active or dormant program, a human being, etc. (ii) an automatic or user prompted submission of the required parameters in every step of the transaction process, (iii) the automatic navigation within the transaction process, (iv) a retrieval of the content returned by the system or specified by the user, and/or (v) the relaying of the content back to the user.

A transaction pattern for any transaction need only be recorded once by anyone with sufficient system access privilege. Once recorded, any user may conduct that transaction, any number of times, by the invocation of the recorded transaction pattern, or "transaction macro."

Since a transaction macro can be stored in any fashion and invoked, directly or indirectly, by any agent (human or automated), it enables the completion of the transaction it describes in any fashion from any device.

System Architecture

Figure 3:
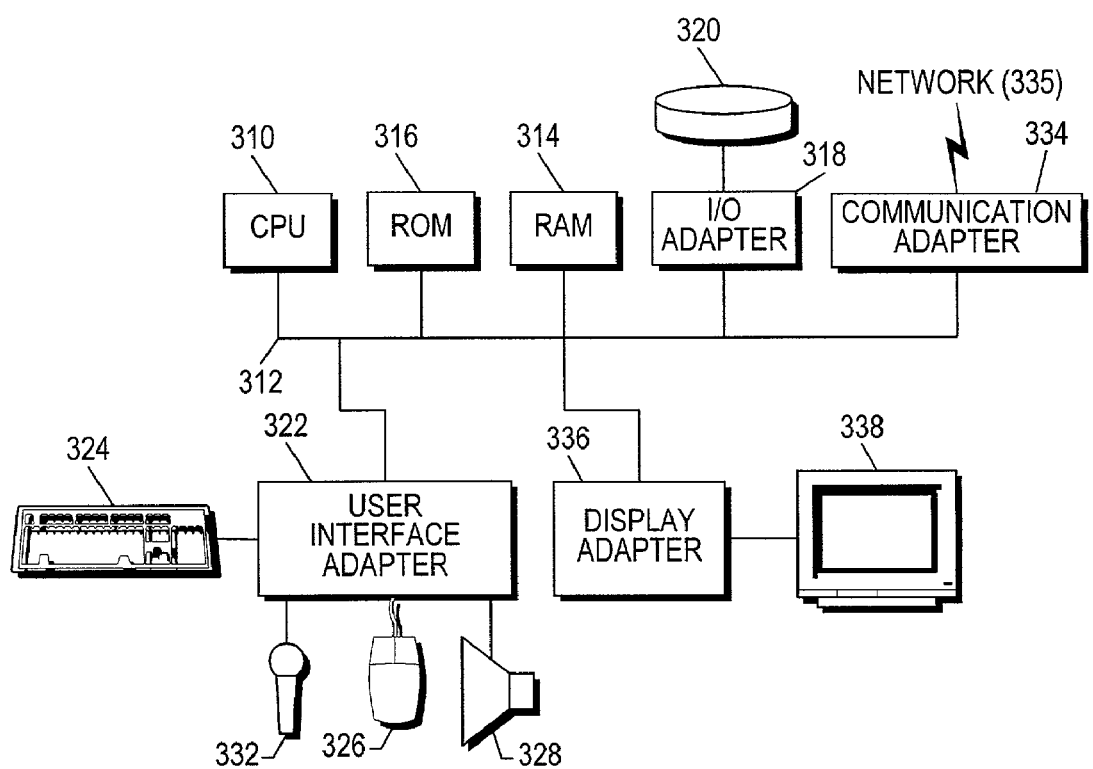
FIG. 3 shows a representative hardware environment on which the method of FIG. 2 may be implemented.

FIG. 3 shows a representative hardware environment on which the method 200 of FIG. 2 may be implemented. Such figure illustrates a typical hardware configuration of a workstation in accordance with a preferred embodiment having a central processing unit 310, such as a microprocessor, and a number of other units interconnected via a system bus 312.

The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network 335 (e.g., a data processing network) and a display adapter 336 for connecting the bus 312 to a display device 338.

The workstation typically has resident thereon an operating system such as the Microsoft Windows NT or Windows/95 Operating System (OS), the IBM OS/2 operating system, the MAC OS, or UNIX operating system. Those skilled in the art may appreciate that the present invention may also be implemented on platforms and operating systems other than those mentioned.

Applications

Following is a plurality of exemplary applications of the present invention. It should be noted that such examples are not exhaustive, and should not be construed as limiting.

Scenario I

Figure 4:
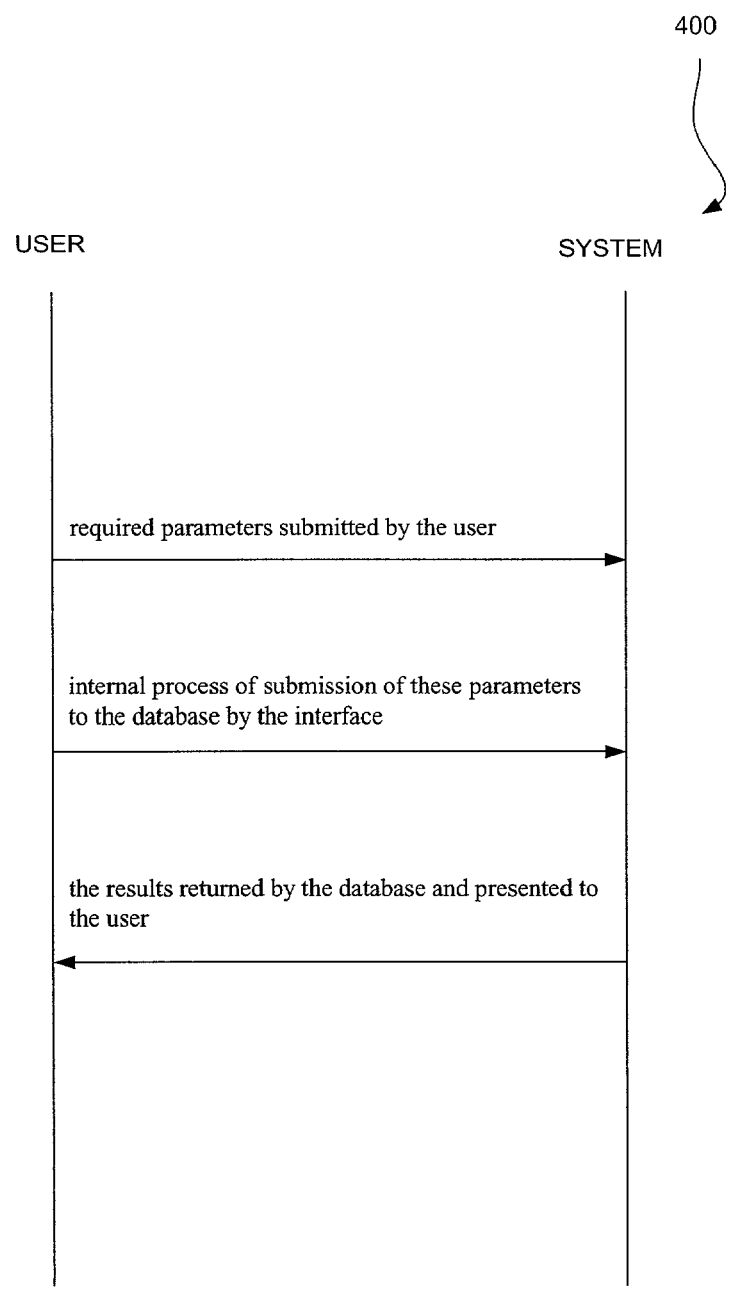
FIG. 4 illustrates an exemplary flow diagram illustrating the various components of a first exemplary transaction pattern.

FIG. 4 illustrates an exemplary flow diagram 400 illustrating the various components of a first exemplary transaction pattern. During operation, a user wishes to retrieve a record from a database. The retrieval of the record involves submitting the required parameters into an interface presented to the user for interacting with the database. Once the parameters are submitted, the results are sent back to the user in some predetermined manner.

In this case, the transaction pattern includes: (i) required parameters submitted by the user (ii) the entire internal process of submission of these parameters to the database by the interface and (iii) the results returned by the database and presented to the user. Note FIG. 4.

Scenario II

Figure 5:
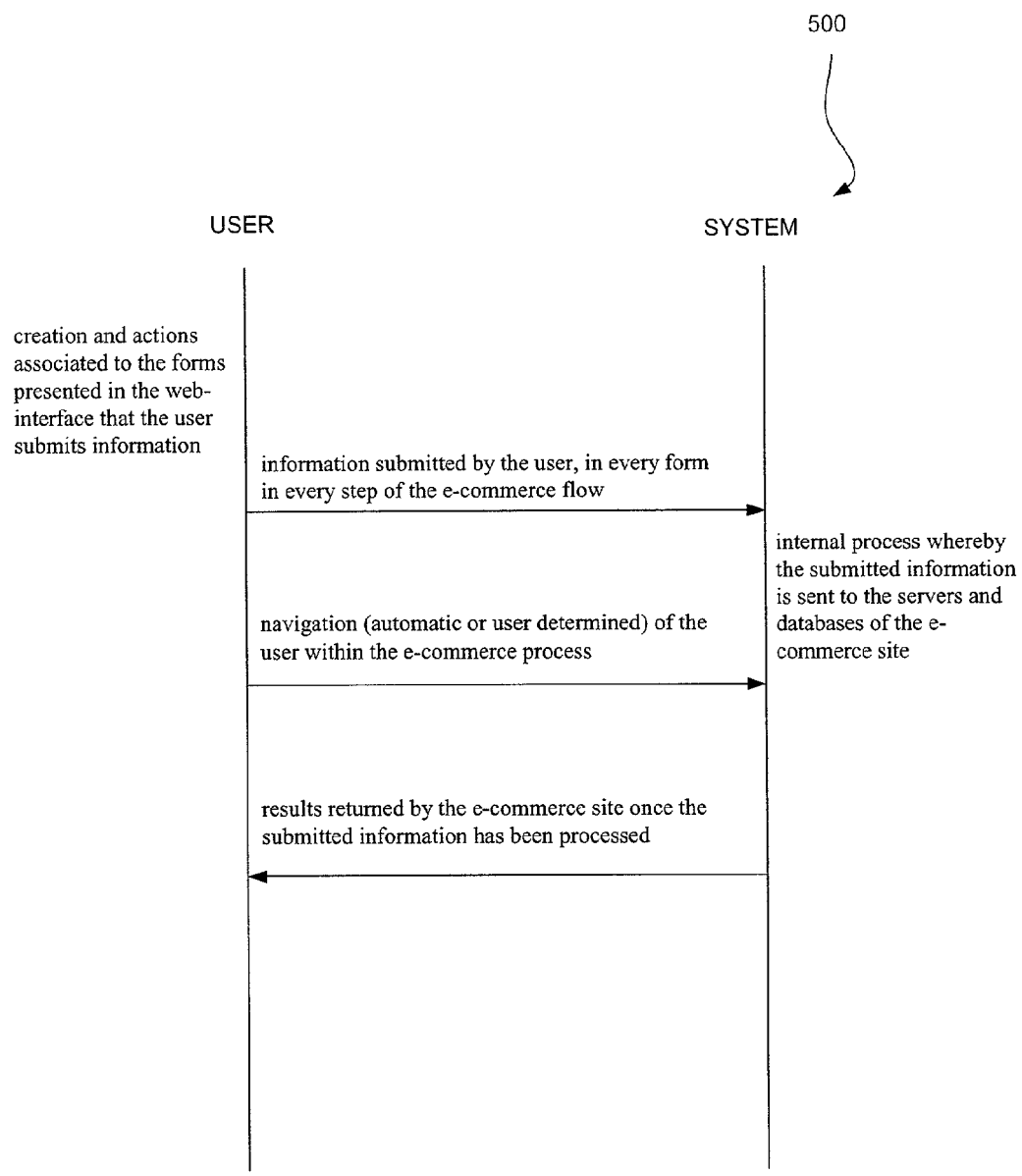
FIG. 5 illustrates an exemplary flow diagram illustrating the various components of a second exemplary transaction pattern.

FIG. 5 illustrates an exemplary flow diagram 500 illustrating the various components of a second exemplary transaction pattern. During operation, a user wishes to purchase an item from an e-commerce web site. The user interacts with the e-commerce interface presented on the web site and submits the required information to purchase the item. The user potentially fills out multiple forms (in multiple steps) that request the user's name, credit card information, shipping address, etc. Once the information has been entered, it is processed and the purchase is approved or rejected.

In this case, the transaction pattern consists of (i) the creation and actions associated with the forms presented in the web-interface with which the user submits information (ii) the information submitted by the user, in every form in every step of the e-commerce flow (iii) the internal process whereby the submitted information is sent to the servers and databases of the e-commerce site (iv) the navigation (automatic or user determined) of the user within the e-commerce process and (v) the results returned by the e-commerce site once the submitted information has been processed. Note FIG. 5.

Scenario III

Figure 6:
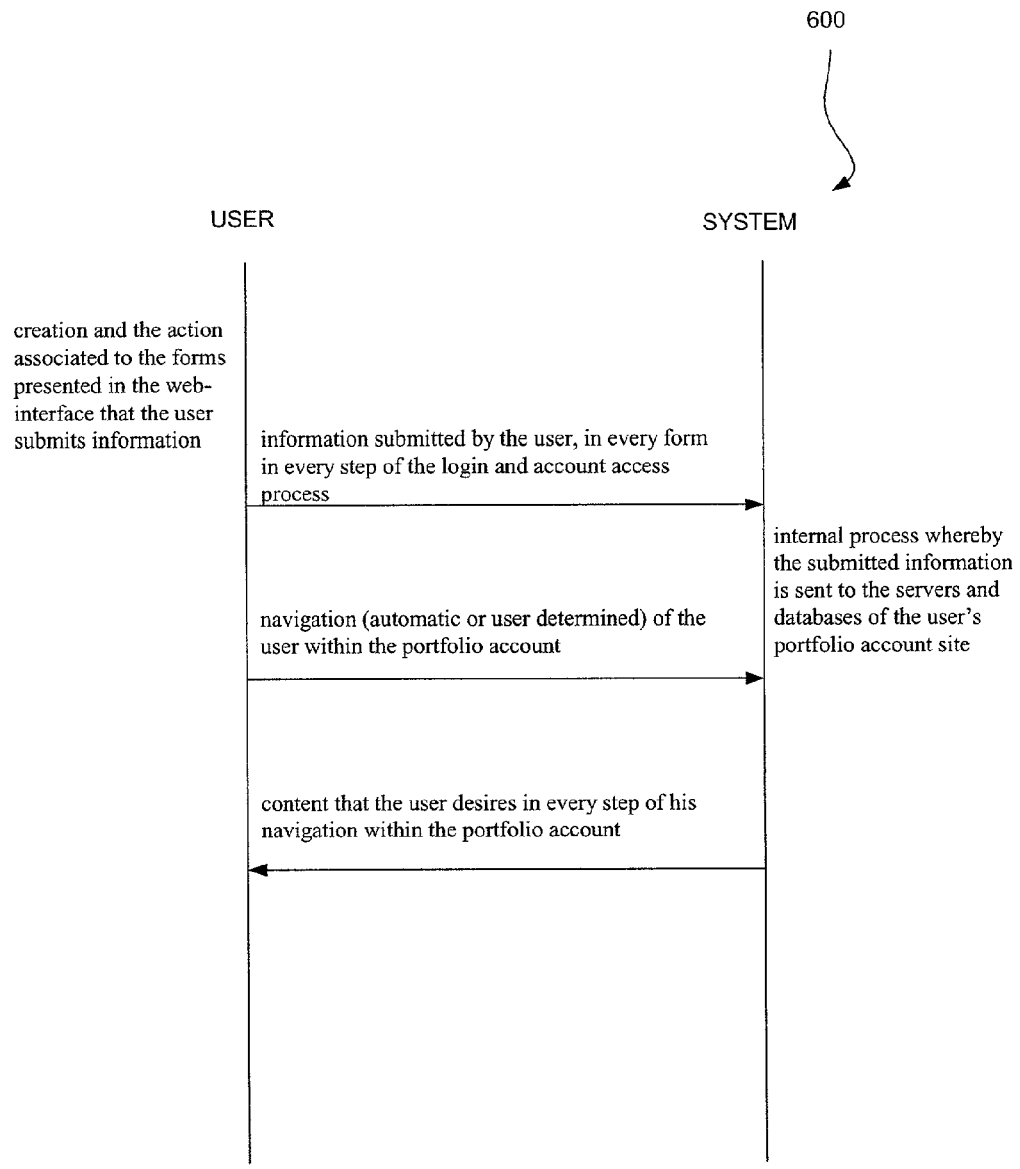
FIG. 6 illustrates an exemplary flow diagram illustrating the various components of a third exemplary transaction pattern.

FIG. 6 illustrates an exemplary flow diagram 600 illustrating the various components of a third exemplary transaction pattern. During operation, a user wishes to log into his stock portfolio account and view his portfolio. He supplies his username, password and potentially other information to gain secure access to this personal information. Once he is logged in, he wishes to view a table summarizing the performance of his stocks. To get to this table, he has to click on a series of hyperlinks, one after the other.

In this case, the transaction pattern consists of (i) the creation and the action associated with the forms presented in the web-interface with which the user submits information (ii) the information submitted by the user, in every form in every step of the login and account access process (iii) the internal process whereby the submitted information is sent to the servers and databases of the user's portfolio account site (iv) the navigation (automatic or user determined) of the user within the portfolio account and (v) all the content that the user desires in every step of his navigation within the portfolio account. Note FIG. 6.

In all of these scenarios, the user submits and retrieves different pieces of information in multiple steps. While it is possible to submit information in this fashion from a desktop computer, it becomes increasingly inconvenient once a user tries to do so through devices other than PC's where the entry of information is not as convenient. Therefore, a process whereby a query or a transaction can be completed and the resulting content sent to the user with a minimum amount of information input and navigation, is highly desirable.

The present invention thus allows any transaction to be automated through the concept of the recording and the playback of a "transaction macro."

Dynamic Content

Figure 7:
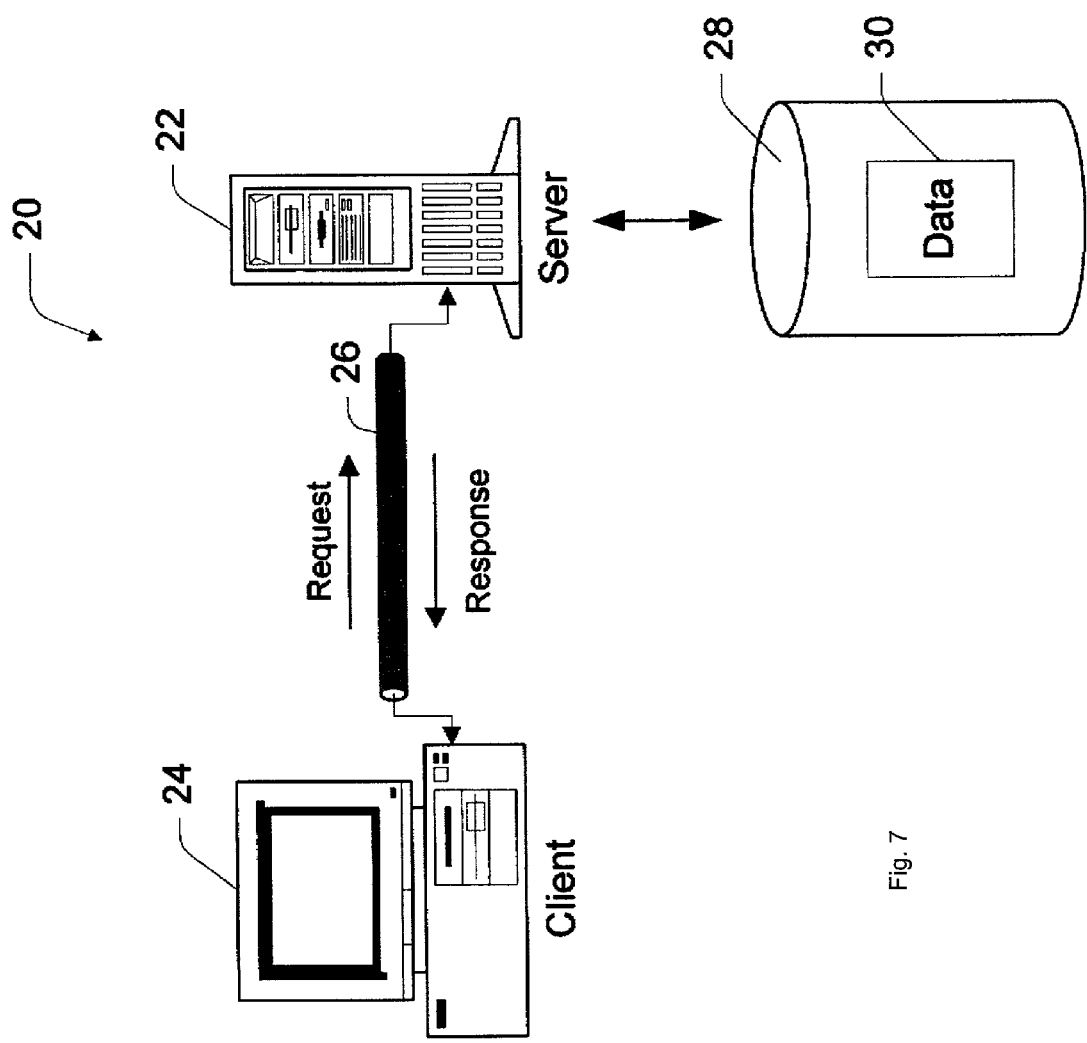
FIGS. 7-9 illustrate an example of dynamic content in the context of the present invention.

A description of dynamic content in the context of the present invention will now be set forth along with a comparison with static content. A computer network system has one or more host network servers connected to serve data to one or more client computers over a network. FIG. 7 shows a simple computer network system 20 with a single host network server 22 connected to serve data to a client 24 via a network 26. The client 24 sends a request for data and/or services to the server 22 over the network 26. The server 22 processes the request and returns a response over the network 26. If the request is for data, the server 22 accesses a database 28 to retrieve the requested data 30 and returns the data 30 as part of the response.

The client-server system 20 is representative of many different environments. One particular environment of interest is the Internet. The server 22 runs a Web server software program that accepts requests from client-based programs (e.g., browsers) and returns data 30 in the form of Web pages or documents to the client 24. The Web pages are commonly written in HTML (hypertext markup language) and XML (extensible markup language). Web pages are transmitted using conventional network protocols, such as TCP/IP (Transmission Control Protocol/Internet Protocol), HTTP (Hypertext Transfer Protocol) and DCOM (Distributed Component Object Model). The client 24 executes a browser or other application to render the Web page into human-perceptible forms. A Web document might include text, images, sound, video, active code, and so forth.

Documents served from a server to client are typically generated using either or both of two methods: a static content method and a dynamic content method. In a static content method, the document is created in advance and stored statically on a server database. When a client requests the document, the server retrieves the document and transmits it over the network to the client. FIG. 7 is an example in which the server retrieves the static data 30 from database 28 and serves the data to the client 24. It is further noted that conventional servers, and particularly Web servers, may be configured to push the content to the client without receiving a request. The static content method has an advantage of minimizing the user's perceived response time, meaning the time between requesting the document and seeing it rendered on a computer screen. It has a disadvantage that all users who request the document receive exactly the same content. With static content, the server cannot respond to specific user requests or personalize a document for individual users.

In a dynamic content method, the document is generated dynamically by the server. When a client requests a document, the server invokes one or more agents, feeding the agents relevant parameters from the user's request (such as the user's name). The agent(s) generate the document that satisfies the user's request and the server returns the document over the network to the client. The dynamic content method has the advantage of responding to specific user requests or personalizing content for individual users. It has the disadvantage that the user's perceived response time will generally be longer than with static document requests. This is because the document generation process involves additional time to invoke the appropriate agent(s) and generate the document.

The server generates dynamic content documents by invoking an agent in one of two ways: an "out-of-process" method and an "in-process" method. In an "out-of-process" method, the agent runs in its own process and address space, separate from the server's process and address space. Typically, the out-of-process method uses the industry-standard common gateway interface (CGI) as the communication mechanism between the server and agent. In an "in-process" method, the agent runs within the Web server's process and address space. The in-process method typically uses a vendor-specific application programming interface, like the Internet Server Application Programming Interface (ISAPI) implemented by Internet Information Server (IIS), which is available from Microsoft Corporation.

To illustrate the two dynamic content methods and how they can be used in conjunction with the static content method, consider a scenario in which the server 22 runs a Web server for an online retail company. When the client 24 first accesses the Web site, the server 22 might retrieve a preexisting home page for the company from the database 28 and serve that page to the client 24. This initial step is an example of a static content method. From the home page, the client might request to view an online catalog of products offered by the company. In response, the Web server might invoke a catalog agent to guide the user through various product offerings. When the user decides to purchase a product, the client submits an order request. In response, the Web server might invoke an order agent to assist the user in ordering the product. The steps involved with actively serving a catalog or taking an order are examples of dynamic content methods. They both involve dynamic generation of documents in response to input received from the client.

Figure 8:
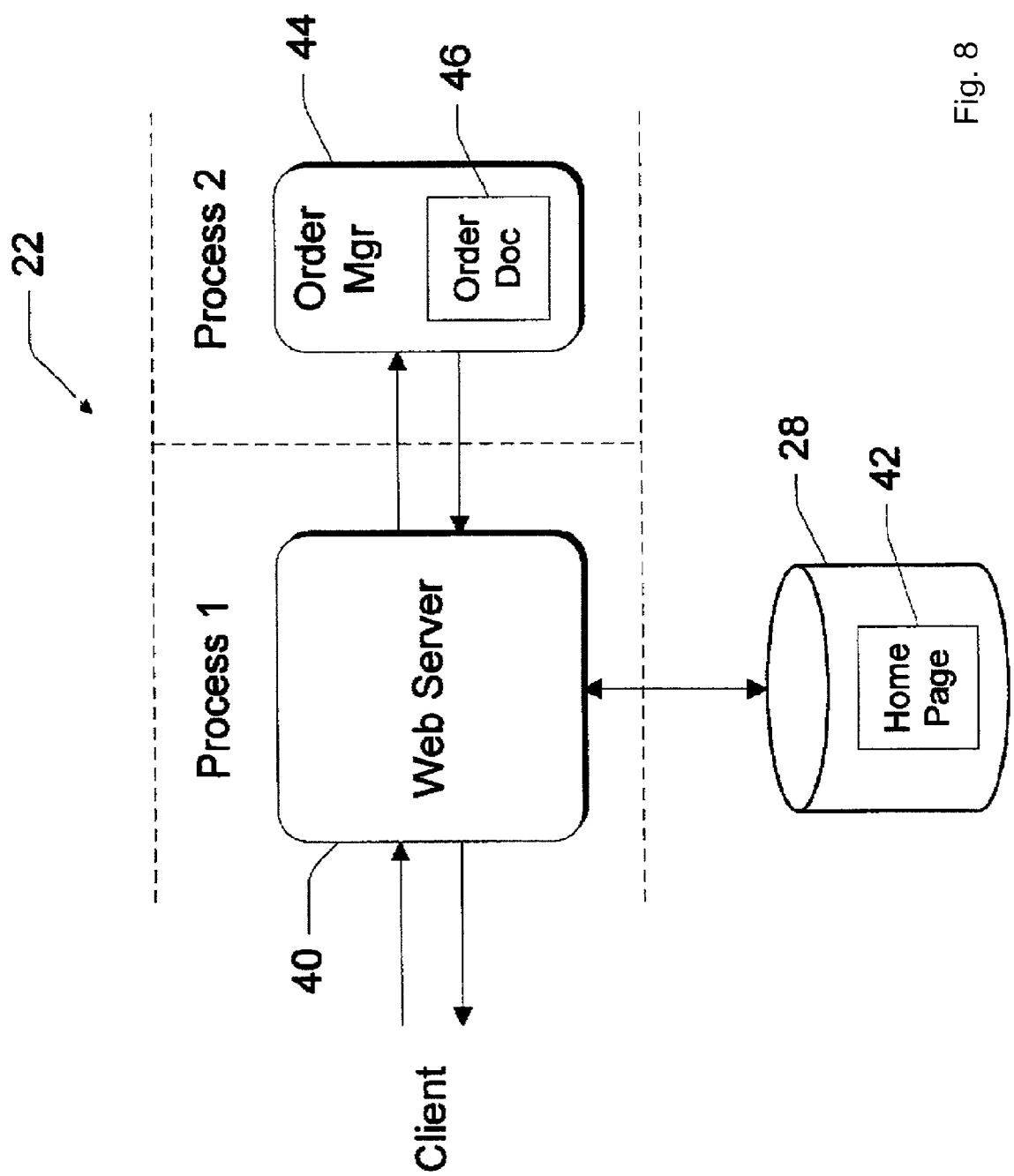

FIG. 8 shows an "out-of-process" method under this scenario. The server 22 runs a Web server 40 as process 1. The Web server 40 handles the incoming requests from the client. When the client first hits the Web site, the Web server 40 retrieves the company's home page 42 from the database 28 and transmits the home page 42 to the client. When the client sends an order request, the Web server 40 initiates an order manager 44 to assist the user with ordering the desired product or service. The order manager 44 is initiated using the CGI technology as a second process 2, which uses a separate process and address space than process 1, as represented by the dashed lines.

When the user selects an item, the order manager 44 dynamically generates an order document 46 that contains the user's name, a description of the selected item, the cost of the item, and payment terms. The order manager 44 returns the order document 46 to the Web server 40, which then serves the document 46 to the client. Afterwards, the order manager 44 is terminated and the second process 2 is halted.

The out-of-process method shown in FIG. 8 has an advantage in crash prevention and recovery. If the out-of-process order manager 44 is unreliable and ultimately crashes, it will not cause the Web server 40 to crash. However, the out-of-process method has a disadvantage in that a particular agent must be loaded into memory each time a request arrives for it. Using CGI technology, the agent must also be unloaded from memory once it finishes the request. This loading and unloading consumes resources, resulting in a relatively slow response time. Another problem compounding the slowness is that the out-of-process method involves cross-process communication between processes 1 and 2, including such activities as marshalling, messaging, and the like.

A variation of CGI, known as FastCGI, allows the server to keep the agent loaded, rather than terminating the agent each time it responds to a particular request. FastCGI is an improvement over CGI in that it saves the per-request invocation overhead, thereby improving the response time. However, the FastCGI is still run in a separate process, and hence the drawbacks associated with cross-process communication remain.

Figure 9:
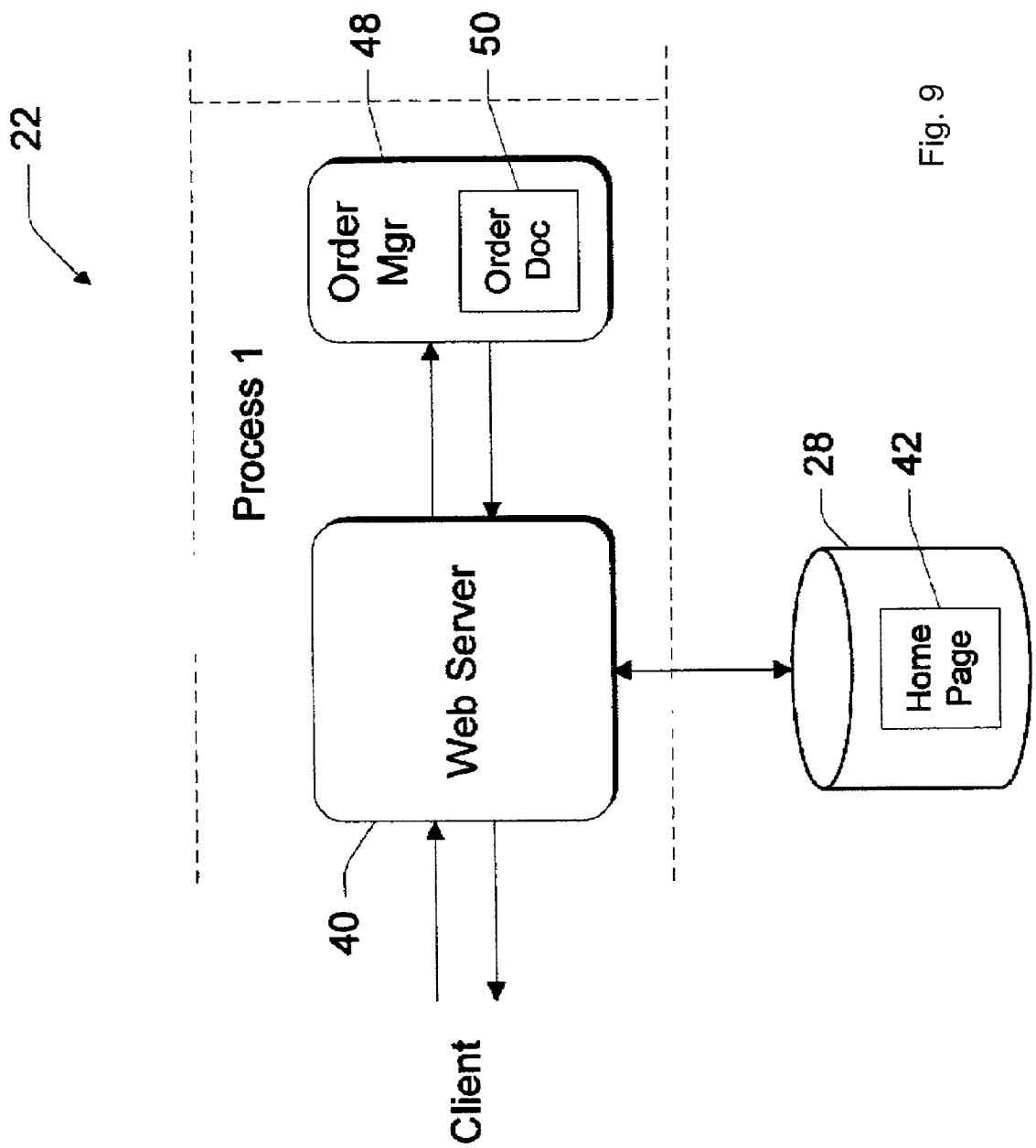

FIG. 9 shows an "in-process" method under the same scenario of the online retail company. In this case, when the client sends an order request, the Web server 40 initiates an order manager 48 to assist the user with ordering the desired product or service. The order manager 48 is initiated using the ISAPI technology to run within the same process 1 as the Web server 40. That is, the Web server 40 and the order manager 48 use the same process and address space designated by the server. When the user selects an item from the online catalog, the order manager 48 dynamically generates an order document 50 that contains the user's name, a description of the selected item, the cost of the item, and payment terms. The order manager 48 returns the order document 50 to the Web server 40, which then serves the document 46 to the client. The order manager 48 can remain loaded for other requests, or terminated when desired.

The in-process method is advantageous in that a particular agent need only be loaded into memory once, when the first request arrives for it. The agent can then remain in memory within the server's process and address space, and can handle additional requests that arrive for it. The in-process method has a further advantage in that there is no need for cross-process communication. As a result, the in-process method is comparatively faster than the out-of-process method.

Mobile Electronic Commerce (M-Commerce)

The prior art has suggested two ways to wireless-enable an electronic commerce "e-commerce") infrastructure. The first is starting from scratch and writing the e-commerce application for wireless devices. The second way is to use the same backend databases, but to recreate the application logic/programming and the presentation logic/programming for wireless. One skilled in the art will realize the long and tedious task presented under either of these methods.

M-Commerce involves the process of mobilizing an existing e-commerce flow to mobile commerce. The present invention leverages an existing e-commerce infrastructure and enables it for wireless applications. The present invention overcomes the disadvantages inherent in the prior art by adding a separate presentation layer to an existing e-commerce application or system. The existing back end databases, application logic/programming, and presentation logic/programming are not affected. In this way, the existing e-commerce application or system can be mobilized without requiring the user to be a programmer. Further, the existing e-commerce application or system can be mobilized without requiring the existing application to be specifically modified. For example, the presentation layer of the present invention can be stored on a server that interacts with the e-commerce related content from the remote site, wireless enables it, and sends it to a user's wireless device.

Pattern Recording and Replay

The additional layer can include pattern recording and replay capabilities to enable wireless ecommerce.

Pattern Recording

A preferred embodiment of the present invention gives its users the ability to create (record) functional elements called patterns and use those elements (replay) in their custom applications. A pattern consists of a collection of states. A state refers to the state of the remote application in its interaction by the user (the designer). States can be of different types. For example, an action that requires accessing the World Wide Web can be represented by an XML (or other type) state and an action that would require sending e-mail can be a part of an SMTP state. Each type of state has a dedicated connector, which is used to create the state definitions and operate on those states. Thus, an XML Connector Module (XCM) is the connector that aids in recording and replaying of XML states. A database connector is used to store and retrieve data from a database, but may or may not point to a next state. An HTML Connector points to a next table. For example, the HTML Connector in state A would instruct a User Agent to execute action X to access state C. The User Agent is used to fetch the output from a remote application and execute any user actions on that output.

Figure 10:
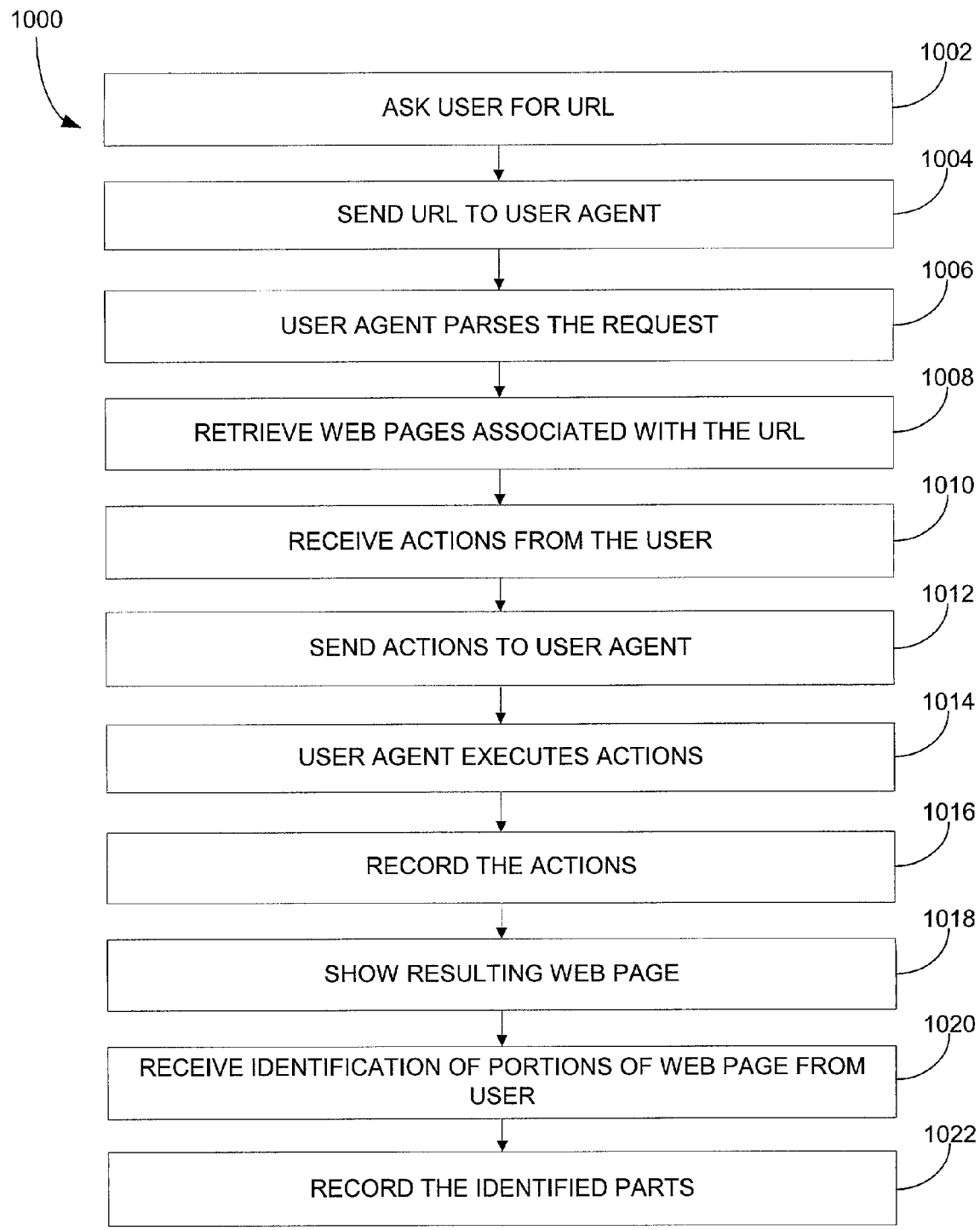
FIG. 10 is a flow chart that illustrates a method for recording a pattern using the User Agent according to one embodiment of the present invention.

FIG. 10 is a flow chart 1000 that illustrates a method for recording a pattern using the User Agent. In particular, the user performs the desired navigation and associated input, which are recorded. In operation 1002, the user is asked for a URL. Upon receiving the URL from the user, the URL is sent to the User Agent in operation 1004. The User Agent parses the request in operation 1006 to determine a meaning of the request. In operation 1008, the User Agent retrieves the web page associated with the URL and sends it back to the user. This (and other) web pages are represented in the pattern as States. In operation 1010, actions are received from the user. Such actions can include selection of links, input of data in fields, etc. The User Agent receives the user input in operation 1012, and in operation 1014, executes the actions on the remote website. The actions are recorded in operation 1016. The resulting web page is shown the to the user in operation 1018. The user then identifies the parts of the page he or she is interested in, which is received in operation 1020. The identified parts are recorded in operation 1022. Note that the inputs entered by the user during recording can be generalized by associating a variable with those inputs, which can be changed during replay.

The system now knows how to retrieve desired information using the pattern. Accordingly, all users using the system can obtain that content. The next (or same) user that wants to perform a similar action enters the URL of the pattern by selecting it. The pattern is replayed with the User Agent executing the actions received of operation 1014. The parts of the web page that were identified by the user and stored in operation 1020 are returned to the user. The user can also define a default area to access in the event that a state is not recognized. See also the description below regarding state identification based on content and probability.

The information stored in a pattern may involve (i) the web or non-web interfaces presented to the user, (ii) the actions performed by the user or the system in the submission of the information, (iii) the parameters required to complete the transaction and submitted by the user, (iv) the automatic or manual navigation of the user within the transaction process, and/or (v) the content or results returned by the system or selected by the user.

A transaction pattern for any transaction need only be recorded once by anyone with sufficient system access privilege. Once recorded, any user may conduct that transaction, any number of times, by the invocation of the recorded transaction pattern, or "transaction macro."

Since a transaction pattern can be stored in any fashion and invoked, directly or indirectly, by any agent (human or automated), it enables the completion of the transaction it describes in any fashion from any device.

As an example of use, suppose the user invokes a pattern to search and buy a book from Amazon.com. The PRE asks the user for a search phrase. The PRE then invokes the UA to submit the search phrase to the Amazon.com website. The UA then picks up the results of the search from the Amazon.com website and presents them to the user properly formatted for the device that the user is using. The formatting can be performed by the TRE, discussed below. The Buy and Buy Later buttons are output along with the results. The user is allowed to select one of the books. The User Agent retrieves additional information about the book (by following a link, for example). If the user clicks on the Buy button, the User Agent follows a pattern to purchase the book automatically by filling in the appropriate information, including pre-stored user address information and credit card information. A Purchase Completed page is shown to the user stating that the book has been purchased.

Exemplary Pattern Recording Interface

According to a preferred embodiment of the present invention, pattern recording is done through an intuitive interface that allows the user to quickly and easily record patterns. More particularly, the interface described in the following paragraphs allows creation of an application for retrieving a variable from a database as well as creation of an interface for displaying the variable on a particular type and/or model of device.

Figure 11:
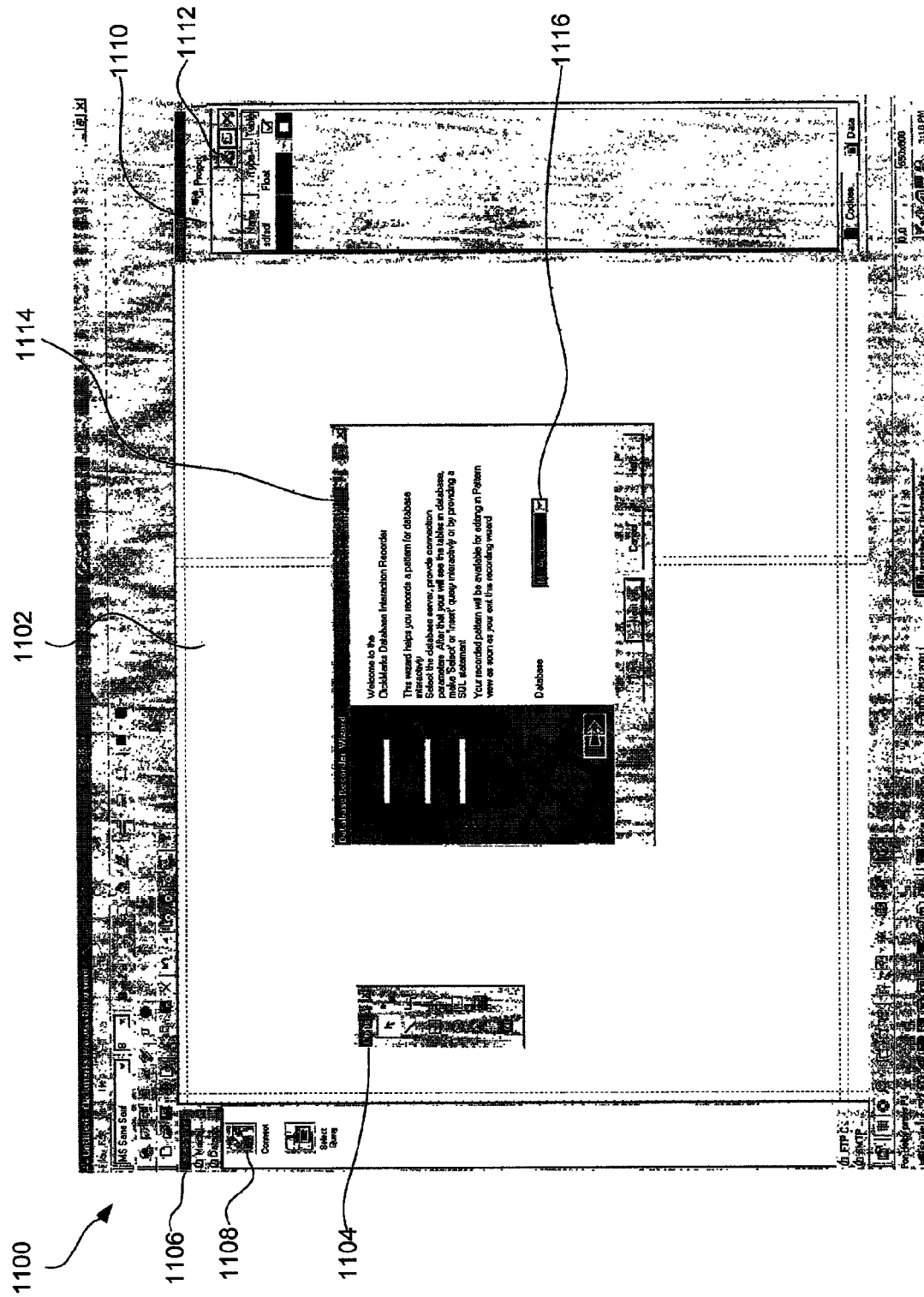
FIG. 11 illustrates a recording interface according to one embodiment of the present invention.

FIG. 11 illustrates a recording interface 1100. As shown, a grid screen 1102 is provided. It is here that the graphical representation of an application for retrieving data from a data site is displayed. An Object Bar 1104 allows insertion of connectors and shapes into the grid screen. A Catalog Bar 1106 displays several types of specialized connectors and components. One specialized connector is the database connector 1108 representing a connection to a database. Selection of the tabs on the Catalog Bar displays different connectors and components. The items in these bars can be dragged and dropped into the grid screen and connected with connectors from the Object Bar. The Project Bar 1110 shows the names and types of variables being manipulated. Variables can be added by using a wizard, which starts upon selection of the wizard button 1112.

The following example illustrates creation of an application for retrieving a customer identifier (ID) from a database and creating an interface for displaying the customer ID on a particular type and/or model of device. As will be discussed in the example, the recording interface allows creation of different interfaces for different devices based on the capabilities of each.

Referring again to FIG. 11, a start screen 1114 is displayed upon selection of the wizard button. The database server is selected from the drop down menu 1116 and the Next button is selected. A database selection screen (not shown) is presented, which allows the user to select the desired database from which the desired data is to be retrieved.

Figure 12:
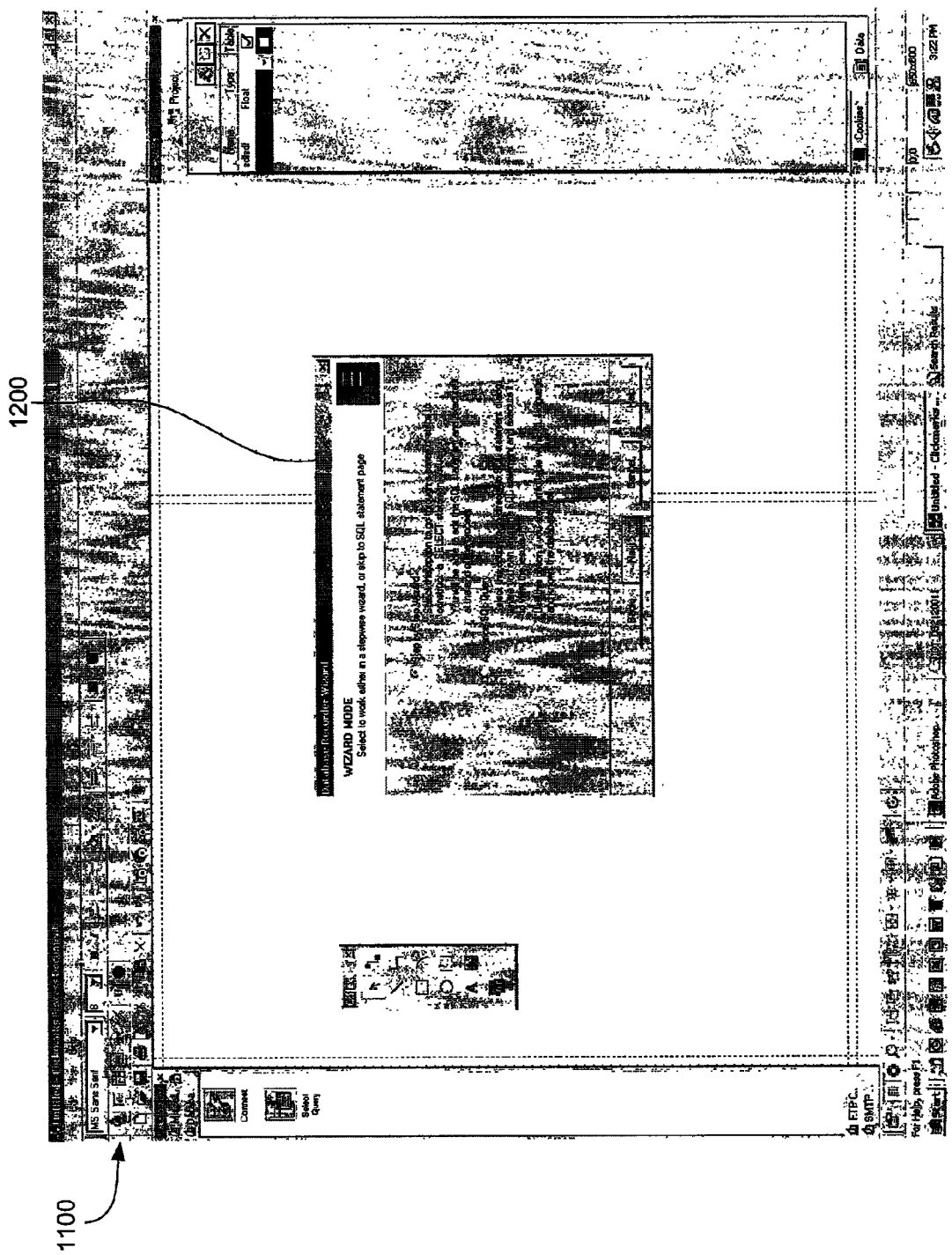
FIG. 12 illustrates a mode selection screen of the interface of FIG. 11.

FIG. 12 illustrates a mode selection screen 1200. Here, the user is allowed to select step by step mode or advanced mode. The desired mode is chosen and the Next button is selected. In this example, the step by step mode is shown.

Figure 13:
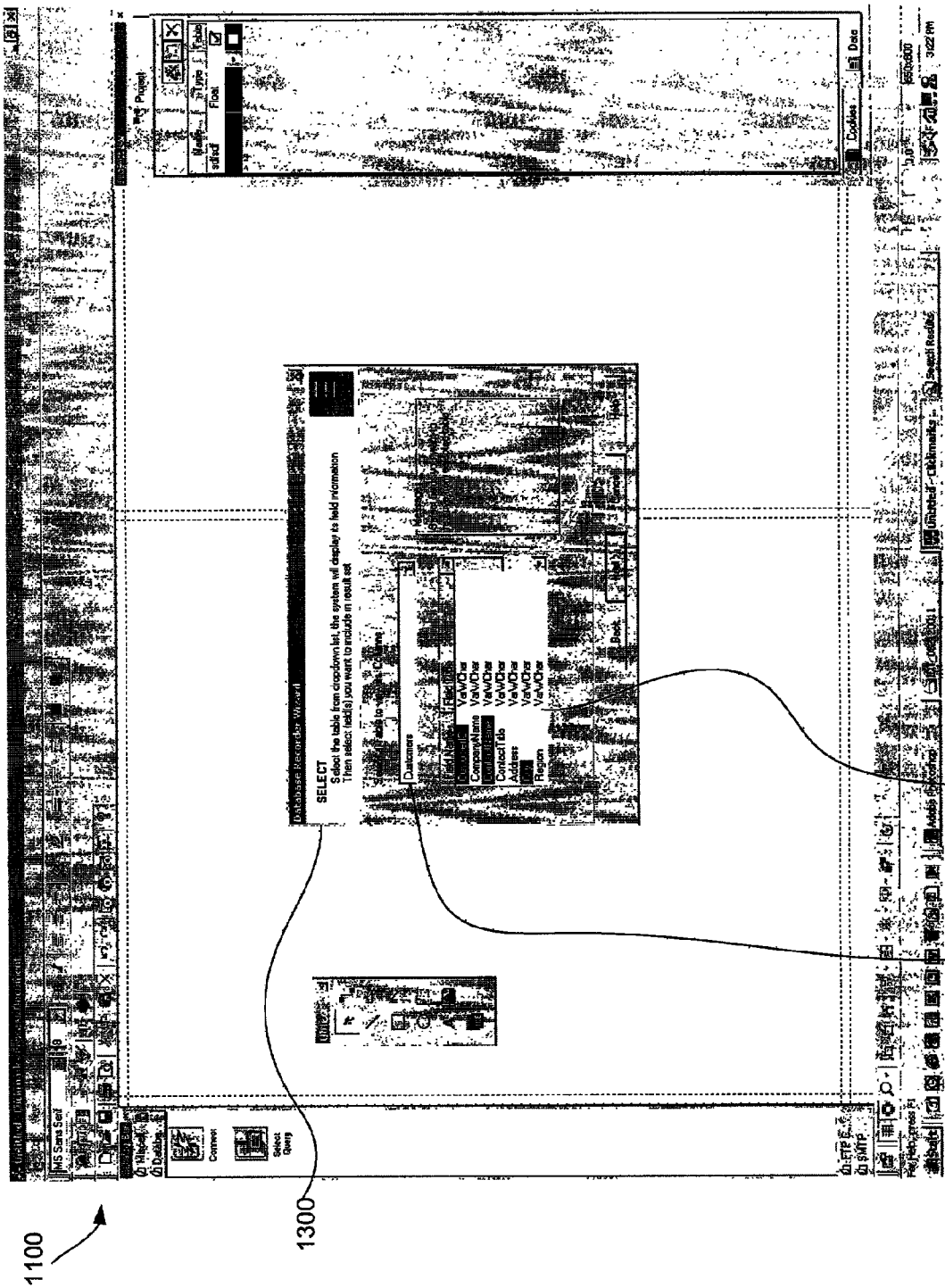
FIG. 13 shows a field selection screen of the interface of FIG. 11.

FIG. 13 shows a field selection screen 1300. The tables of the selected database are presented in the drop down menu 1302. The user is allowed to select which table to view. The fields of the selected table are presented in the fields display portion 1304. The user is allowed to select one or more fields from the field display portion. Note, multiple fields can be chosen using CTRL+R-click. The Next button is selected.

Figure 14:
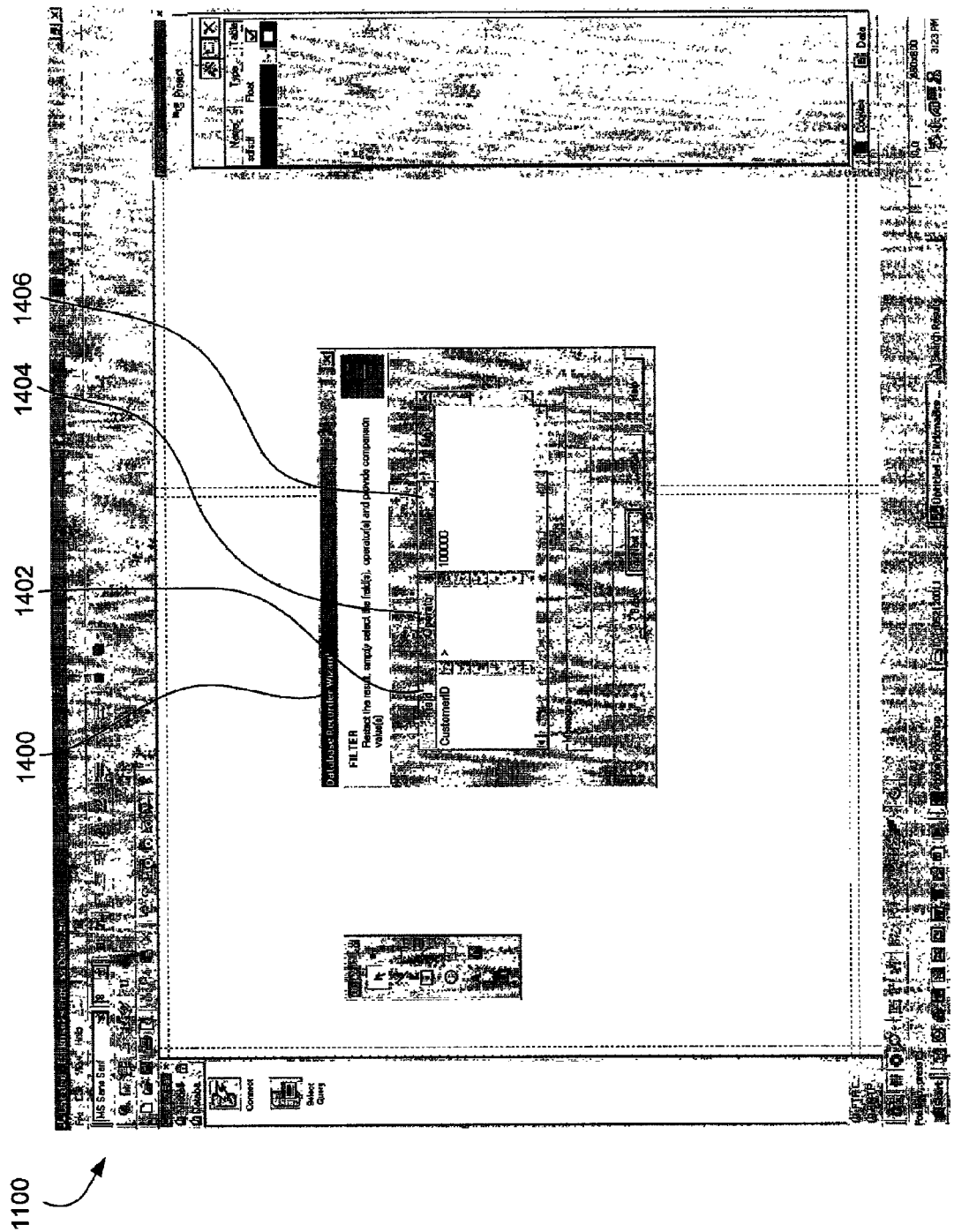
FIG. 14 depicts a filter screen of the interface of FIG. 11.

FIG. 14 depicts a filter screen 1400, which allows entry of filtering elements used to restrict the variables retrieved from the database. As shown, the field chosen in the field selection screen is displayed in the Field column 1402. Operands can be entered into the Operator column 1404 (or chosen from a drop down menu). Illustrative operands include $>$, $<$, $\geq$, $\leq$, and $=$. The Value column 1406 receives comparison values, to which the variables associated with the field are compared using the operand. The Next button is selected.

Figure 15:
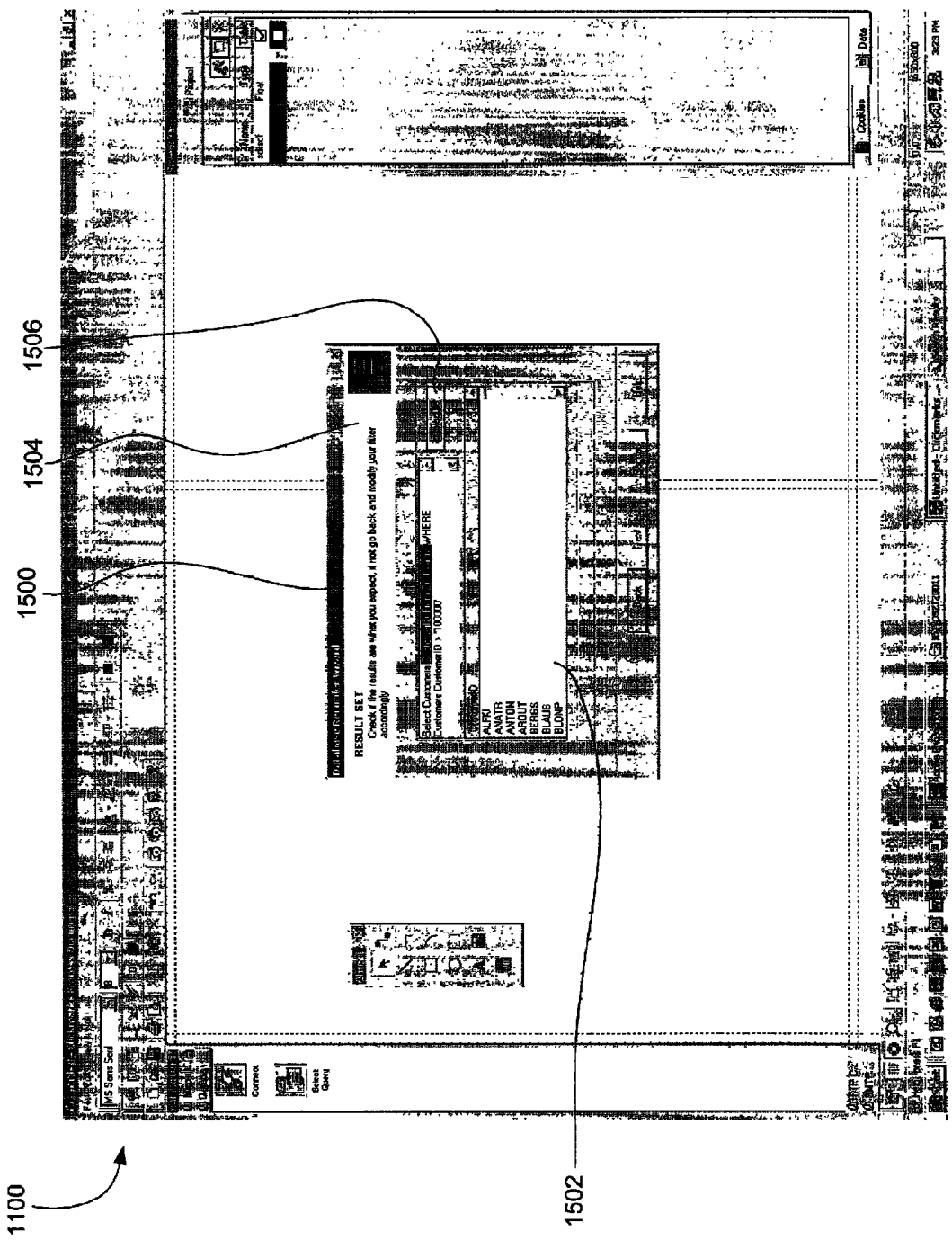
FIG. 15 illustrates a results screen of the interface of FIG. 11.

FIG. 15 illustrates a results screen 1500 displaying the results of the query in a results portion 1502. The query is also displayed in a query portion 1504. The query may be edited in the query portion to change the results returned. The Execute button 1506 is selected to re-execute the query and retrieve results of the edited query. The Next button is selected.

Figure 16:
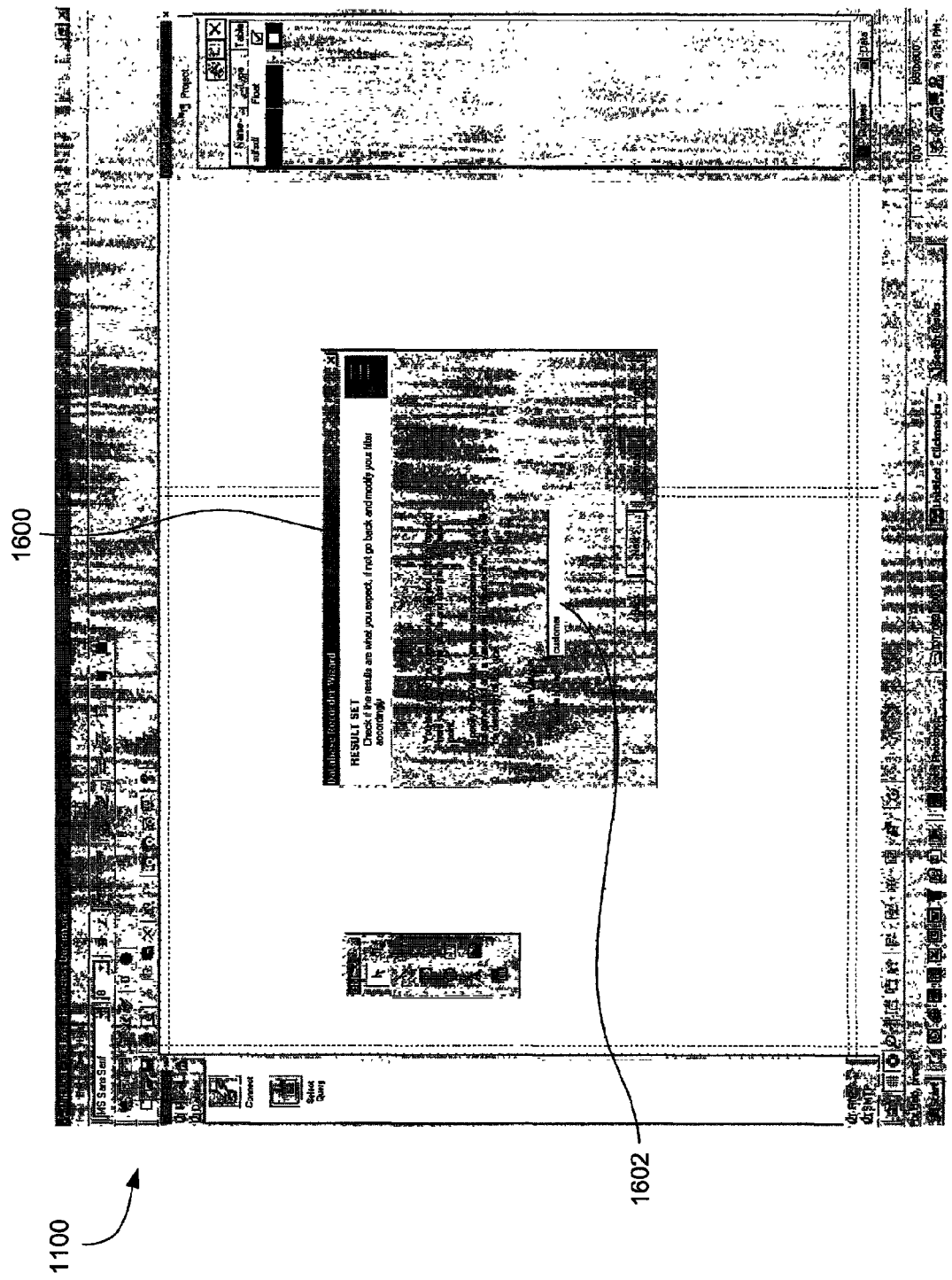
FIG. 16 illustrates an assign variable screen of the interface of FIG. 11.

FIG. 16 illustrates an assign variable screen 1600. Here, the results are assigned to a variable and saved for later use. The name of the variable is entered in the Variable Name field 1602. In this example, the variable is named "customer." The Next button is selected.

Figure 17:
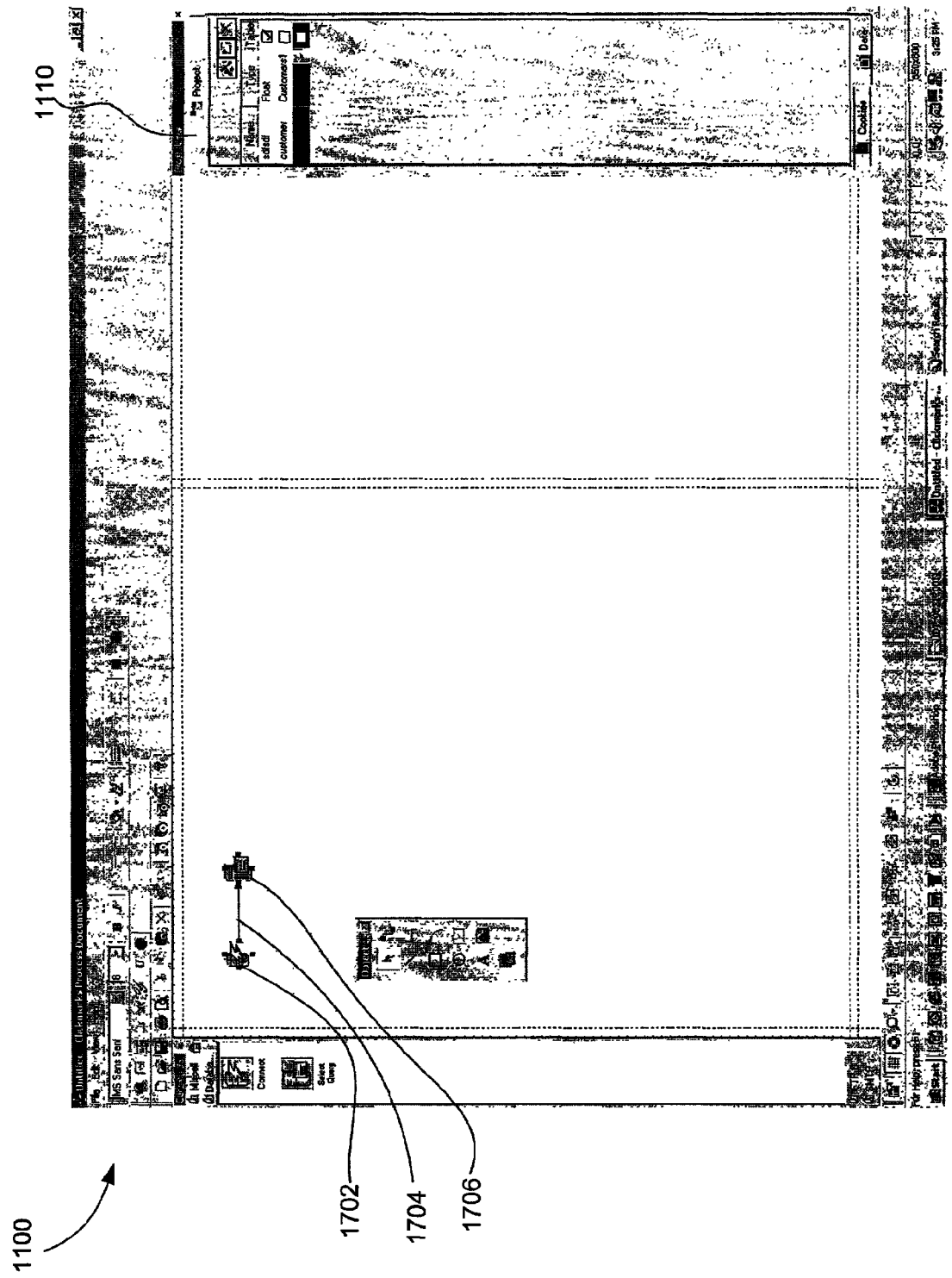
FIG. 17 shows the grid screen of the interface of FIG. 11.

FIG. 17 shows the grid screen 1100. The new variable "customer" now appears in the Project Bar 1110. A Database Connector 1702 is dragged from the Catalog Bar, as is a Select Query object 1704. A connector 1706 is dragged and dropped from the Object Bar to the grid screen and used to connect the Database Connector and the Select Query object.

Figure 18:
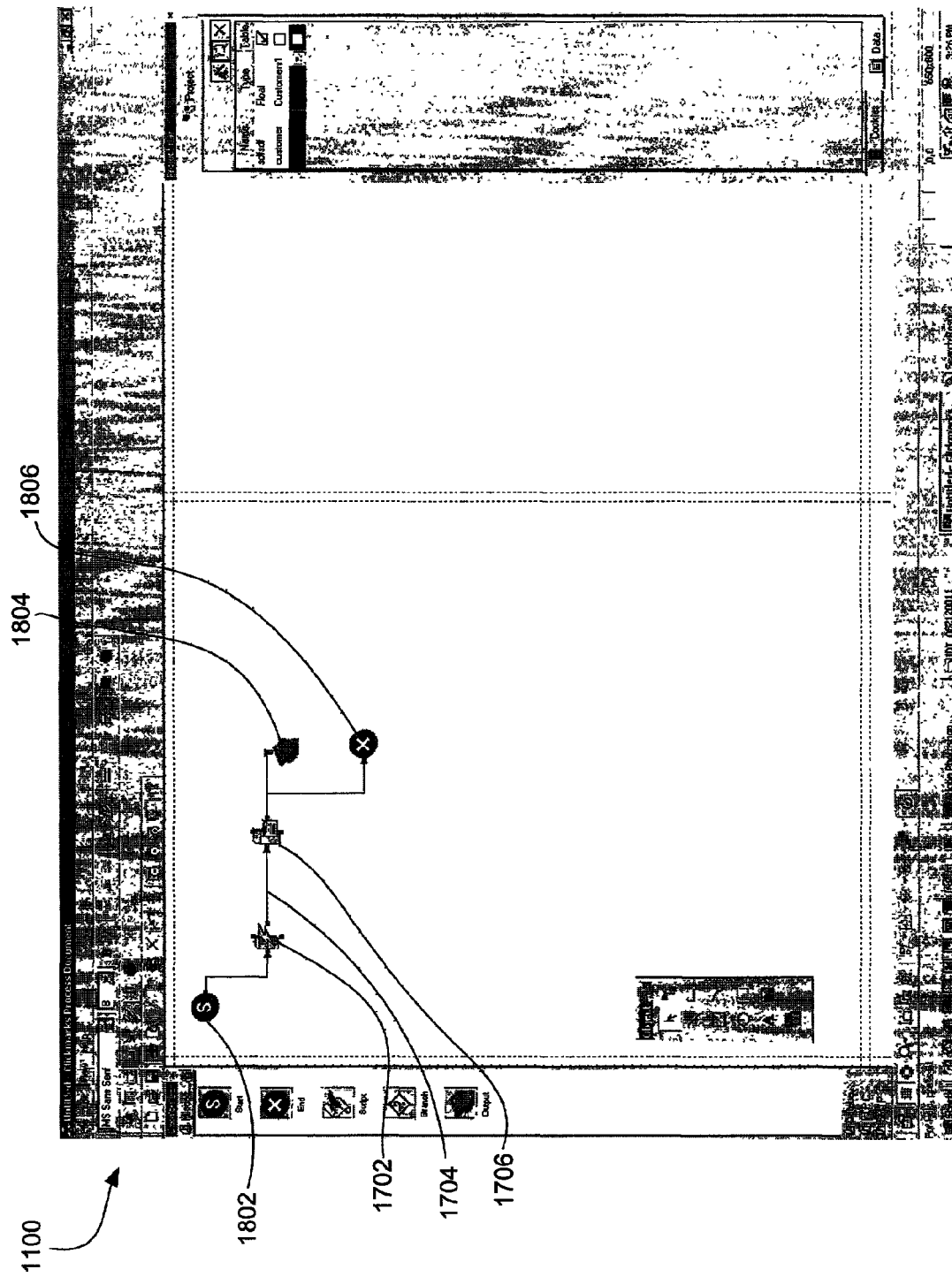
FIG. 18 shows the grid screen of FIG. 17 with additional objects added.

FIG. 18 shows the grid screen with additional objects added. Here, a Start Process object 1802, an Output object 1804, an End Process object 1806, and connectors have been added.

Figure 19:
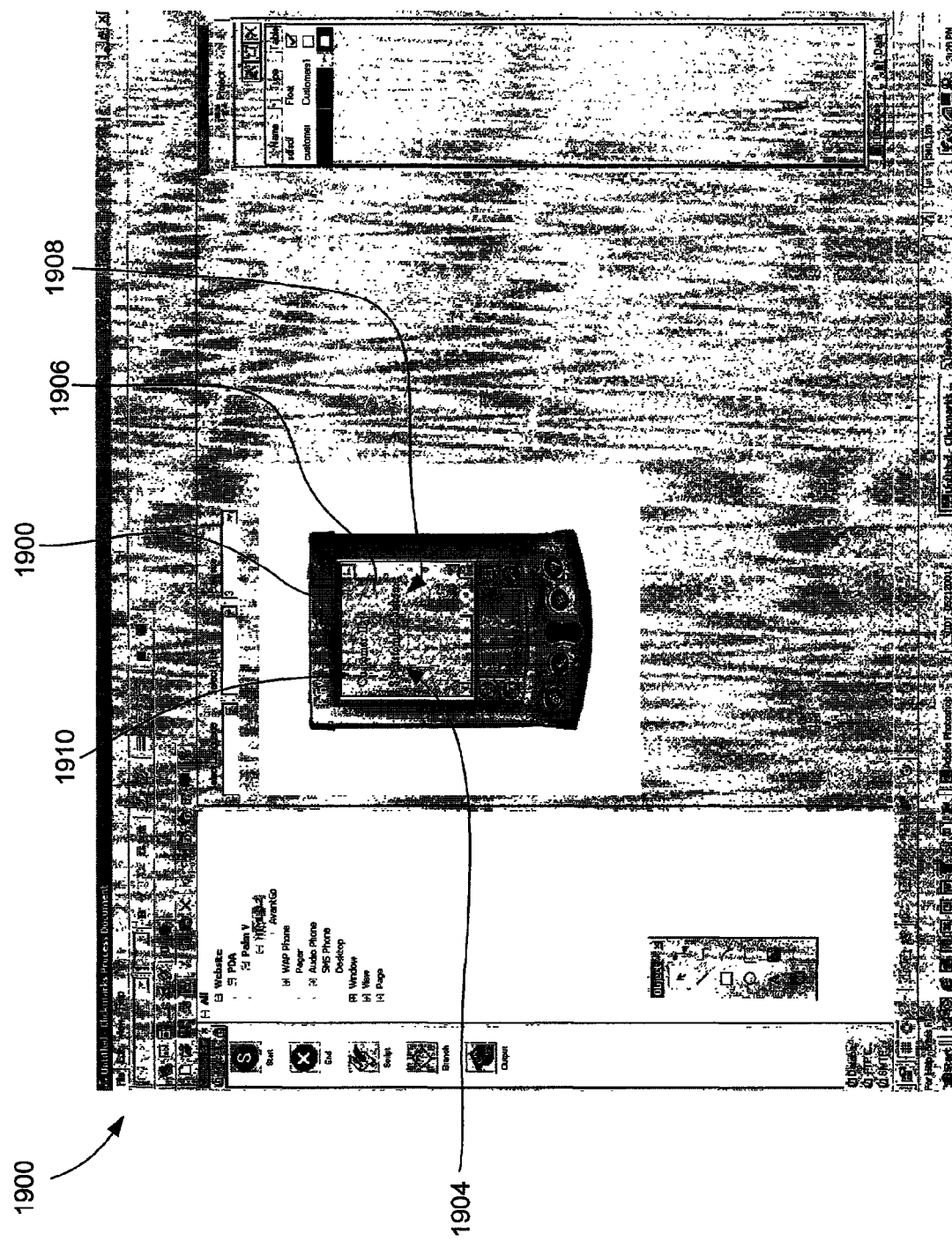
FIG. 19 illustrates a display specification screen of the interface of FIG. 11 from which the user can specify the manner in which variables are displayed on particular devices.

FIG. 19 illustrates a display specification screen 1900 from which the user can specify the manner in which variables are displayed on particular devices. As shown, various devices are shown in a tree structure. A type of device is selected, here the Palm V version of the PDA. A representation 1902 of the PDA is displayed. The identifier "customer" 1904 is added to the simulated display 1906 of the PDA. The variable field 1908 is also added to the display. During runtime, the actual result of the query is displayed in place of the identifier and variable field. Text may also be added for output in this screen. Here, the words "Customer ID:" 1910 have been added.

For example, a website may have a table having an output with five columns. On a PDA, perhaps only four columns can be displayed on the display. The output can be set to only show four variables. Similarly, if only two columns of the table can be displayed on a phone, the output can be set to show only two variables. More information about operation and functionality of the PRE is found in US Patent Application entitled SYSTEM, METHOD AND COMPUTER PROGRAM PRODUCT FOR PATTERN REPLAY USING STATE RECOGNITION, filed concurrently herewith under Ser. No. 09/942,080 and assigned to common assignee Clickmarks, Inc., and which is herein incorporated by reference.

Pattern Replay Engine

The Pattern Replay Engine (PRE) is the component of the platform that is responsible for replaying a pattern from one particular state to another during runtime.

Figure 20:
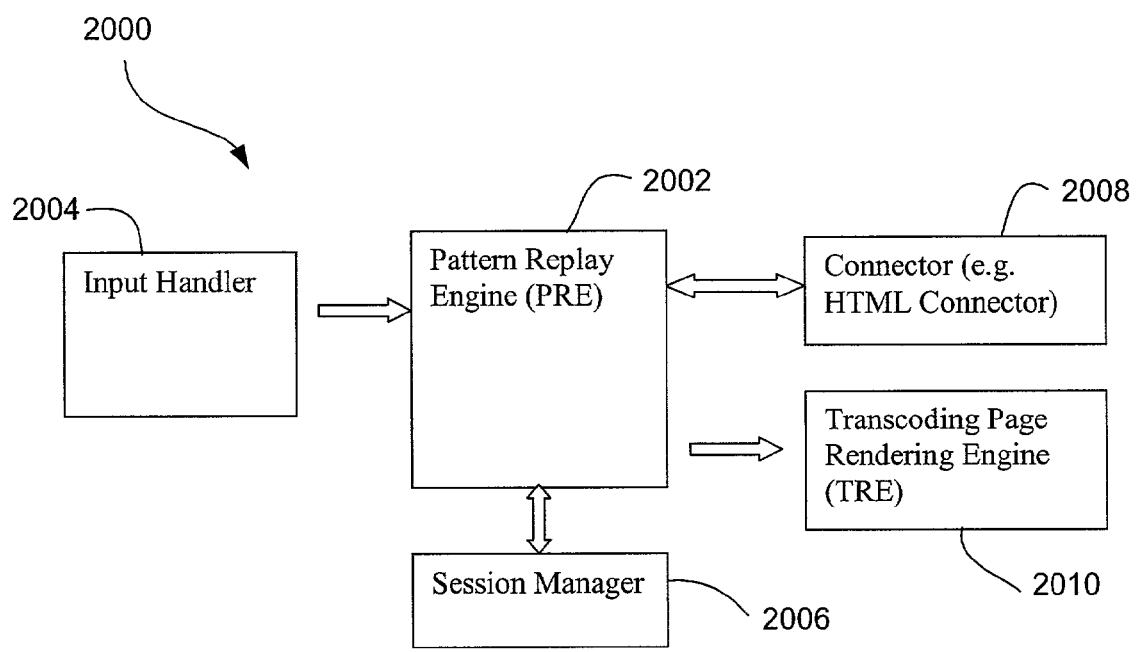
FIG. 20 gives a general overview of how the PRE interfaces with other major components of the system according to one embodiment of the present invention.

FIG. 20 gives a general overview of how the PRE 2002 interfaces with other major components including the Input Handler 2004, session manager 2006, connector b0008 (discussed in detail below), and TRE 2010.

The PRE is a request-driven component. The PRE takes the request to make a transition from a particular State. Transitions from one State to another are made by executing Actions. The PRE communicates with the appropriate Connector (of the current State) to execute the current Action in the request and get the new resulting State. Next, all Script associated with the State is evaluated.

The PRE then calls the Transcoding Page Rendering Engine (TRE) to "flush" its output to the device. This means that any Content, which has been queued for display in the TRE (while processing the request), is sent to the device. Every state can potentially generate output to be displayed on the device, including internal states. This is a desirable feature as it means the designer can send a status message to the device, e.g. "Please wait while processing." etc. Finally, a script is called, which can initiate further State transitions from this script method if necessary.

More information about operation and functionality of the PRE is found in US Patent Application entitled SYSTEM, METHOD AND COMPUTER PROGRAM PRODUCT FOR PATTERN REPLAY USING STATE RECOGNITION, discussed above.

Transcoding Page Rendering Engine (TRE)

The Transcoding Page Rendering Engine (TRE) is a tool used to render content on any display environment.

Figure 21:
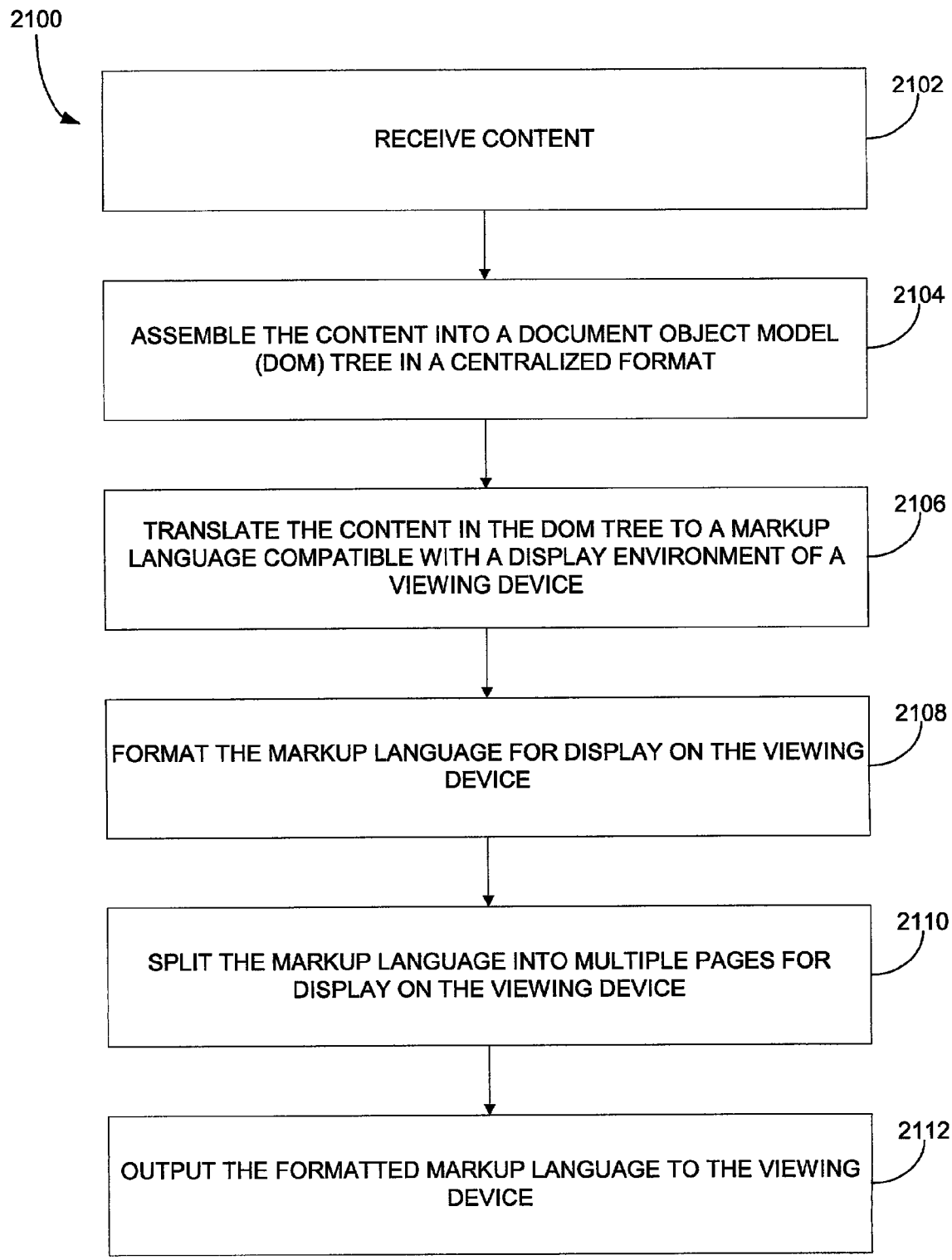
FIG. 21 is a flowchart of the TRE process for rendering arbitrary content for display on a particular viewing device according to a preferred embodiment of the present invention.

FIG. 21 is a flowchart of the TRE process 2100 for rendering arbitrary content for display on a particular viewing device according to a preferred embodiment of the present invention. In operation 2102, content is received. In operation 2104, the content is built into a DOM tree in an extended version of XHTML, referred to herein as CXHTML. Note that CXHTML is used herein by way of example only, and any suitable format can be used. For example, the format can be any XML form. This DOM tree is then processed in operation 2106 by several modules which translate the CXHTML into an appropriate markup language for the viewing environment and format this markup language to display best on the viewing device in operation 2108, which may include splitting the markup language into multiple pages. Note operation 2110. The markup language representation of the content can also be translated into the user's native language and/or character set. In operation 2112, the content is output to the viewing device.

More information about operation and functionality of the TRE is found in US Patent Application entitled SYSTEM, METHOD AND COMPUTER PROGRAM PRODUCT FOR PAGE RENDERING UTILIZING TRANSCODING, filed concurrently herewith under Ser. No. 09/942,051 and assigned to common assignee Clickmarks, Inc., and which is herein incorporated by reference.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for carrying out a computer-implemented transaction, comprising:
    storing in memory a transaction pattern detailing a transaction associated with a single user; and
    executing the transaction pattern to carry out another transaction;
    wherein the transaction pattern includes a record of: information submitted by the single user, user actions taken by the single user, system actions taken by a system in response to the information and the user actions in order to generate results, and the results that are sent to the single user;
    wherein the storage of the transaction pattern includes storage of records of a navigation of the single user during the transaction;
    wherein the transaction pattern further includes information submitted by the single user, in each form and in each step of a login and account access process;
    wherein the transaction pattern further includes a record of the actions taken by the system which enable access of the single user to data, and actions enabled by the data to retrieve content;
    wherein the execution of the transaction pattern includes recognizing a state of a remote application in its interaction with the single user, the state representing an action to be performed by the remote application.

2. The method as recited in claim 1, wherein the storage of the transaction pattern includes the storage of records relating to an interface presented to the single user.

3. The method as recited in claim 1, wherein the storage of the transaction pattern includes the storage of records relating to the submission of information by the single user.

4. The method as recited in claim 1, wherein the storage of the transaction pattern includes the storage of parameters required to complete the transaction.

5. The method as recited in claim 1, wherein the storage of the transaction pattern includes the storage of information returned to the single user by the system.

6. The method as recited in claim 1, wherein the storage of the transaction pattern includes the storage of information selected by the single user.

7. The method as recited in claim 1, wherein the execution of the transaction pattern includes retrieval of the transaction pattern by at least one of an automated agent and a programmable agent.

8. The method as recited in claim 1, wherein the execution of the transaction pattern includes submission of required parameters during the other transaction.

9. The method as recited in claim 1, wherein the execution of the transaction pattern involves automatic navigation during the other transaction.

10. The method as recited in claim 1, wherein the execution of the transaction pattern includes retrieval of the content.

11. The method as recited in claim 1, wherein the execution of the transaction pattern includes relaying the content to the single user.

12. The method as recited in claim 1, wherein the transaction pattern further includes an internal process, whereby submitted information is sent to servers and databases of a portfolio account site of the single user.

13. The method as recited in claim 1, wherein the information submitted by the single user is submitted via an e-commerce form, the information including a name of the single user, credit card information associated with the single user, and a shipping address of the single user.

14. The method as recited in claim 1, wherein the state of the remote application is recognized based on content and probability of a web page represented as the state, and includes a dedicated connector used to create state definitions and to operate on states.

15. The method as recited in claim 1, wherein the remote application is an electronic commerce application.

16. A computer program product, embodied on a non-transitory computer readable medium and capable of execution on a computer, for carrying out a computer-implemented transaction, comprising:
   computer code for storing in memory a transaction pattern detailing a transaction associated with a single user; and
   computer code for executing the transaction pattern to carry out another transaction;
   wherein the transaction pattern includes a record of: information submitted by the single user, user actions taken by the single user, system actions taken by a system in response to the information and the user actions in order to generate results, and the results that are sent to the single user;
   wherein the storage of the transaction pattern includes storage of records for a navigation of the single user during the transaction;
   wherein the transaction pattern further includes information submitted by the single user, in each form and in each step of a login and account access process;
   wherein the transaction pattern further includes a record of the actions taken by the system which enable access of the single user to data, and actions enabled by the data to retrieve content;
   wherein the computer code is operable such that the execution of the transaction pattern includes recognizing a state of a remote application in its interaction with the single user, the state representing an action to be performed by the remote application.

17. The computer program product as recited in claim 16, wherein the storage of the transaction pattern includes the storage of records relating to an interface presented to the single user.

18. The computer program product as recited in claim 16, wherein the storage of the transaction pattern includes the storage of records relating to the submission of information by the single user.

19. The computer program product as recited in claim 16, wherein the storage of the transaction pattern includes the storage of parameters required to complete the transaction.

20. The computer program product as recited in claim 16, wherein the storage of the transaction pattern includes the storage of records relating to the navigation of the single user during the transaction.

21. The computer program product as recited in claim 16, wherein the storage of the transaction pattern includes the storage of information returned to the single user by the system.

22. The computer program product as recited in claim 16, wherein the storage of the transaction pattern includes {.he storage of information selected by the single user.

23. The computer program product as recited in claim 16, wherein the execution of the transaction pattern includes retrieval of the transaction pattern by at least one of an automated agent and a programmable agent.

24. The computer program product as recited in claim 16, wherein the execution of the transaction pattern includes submission of required parameters during the other transaction.

25. The computer program product as recited in claim 16, wherein the execution of the transaction pattern involves automatic navigation during the other transaction.

26. The computer program product as recited in claim 16, wherein the execution of the transaction pattern includes retrieval of the content.

27. The computer program product as recited in claim 16, wherein the execution of the transaction pattern includes relaying the content to the single user.

28. A method for carrying out a computer-implemented transaction, comprising:
   recording information submitted by a single user as part of a transaction associated with the single user;
   recording user actions taken by the single user as part of the transaction;
   recording system actions taken by a system in response to the information and the user actions in order to generate results as part of the transaction;
   recording the results that are sent to the single user as part of the transaction;
   generating a transaction pattern based on the recorded information;
   storing the transaction pattern in memory; and
   executing the transaction pattern to automatically carry out another transaction upon receiving a user request for the transaction;
   wherein the storage of the transaction pattern includes storage of records of a navigation of the single user during the transaction;
   wherein the transaction pattern includes information submitted by the single user, in each form and in each step of a login and account access process;
   wherein the transaction pattern further includes a record of actions taken by the system which enable access of the single user to data, and actions enabled by the data to retrieve content;
   wherein the execution of the transaction pattern includes recognizing a state of a remote application in its interaction with the single user, the state representing an action to be performed by the remote application.

29. The method as recited in claim 28, wherein the storage of the transaction pattern includes the storage of information returned to the single user by the system.

30. The method as recited in claim 28, wherein the storage of the transaction pattern includes the storage of information selected by the single user.

31. The method as recited in claim 28, wherein the execution of the transaction pattern includes retrieval of the transaction pattern by at least one of an automated agent and a programmable agent.

32. The method as recited in claim 28, wherein the execution of the transaction pattern involves automatic navigation during the other transaction.

33. The method as recited in claim 28, wherein the execution of the transaction pattern includes relaying the content to the single user.

34. A method for carrying out a computer-implemented electronic commerce (e-commerce) transaction, comprising:
   storing in memory a transaction pattern detailing a transaction associated with a single user, wherein the transaction pattern includes a record of:
      creation of and actions associated with forms presented in a web-interface with which the single user submits information;
      information submitted by the single user, in forms presented in an e-commerce flow;
      an internal process whereby the submitted information is sent to servers and databases of an e-commerce site;
      navigation of the single user within the e-commerce process;
      system actions taken by a system in response to the information and the creation and actions in order to generate results; and
      the results returned by the e-commerce site once the submitted information has been processed; and
   executing the transaction pattern to carry out another transaction;
   wherein the transaction pattern further includes information submitted by the single user, in each form and in each step of a login and account access process;
   wherein the transaction pattern further includes a record of actions taken by the system which enable access of the single user to data, and actions enabled by the data to retrieve content;
   wherein the execution of the transaction pattern includes recognizing a state of a remote application in its interaction with the single user, the state representing an action to be performed by the remote application.

35. A method for carrying out a computer-implemented transaction, comprising:
   recording information submitted by a single user as part of a transaction associated with the single user;
   recording user actions taken by the single user as part of the transaction;
   recording system actions taken by a system in response to the information and the user actions in order to generate results as part of the transaction;
   recording the results that are sent to the single user as part of the transaction;
   recording actions taken by the system which enable the single user to access data;
   recording actions enabled by the data to retrieve content;
   generating a transaction pattern based on the recorded information;
   storing the transaction pattern in memory, including:
      storing records relating to an interface presented to the single user;
      storing records relating to the submission of information by the single user;
      storing parameters required to complete the transaction;
      storing records of a navigation of the single user during the transaction;
      storing records relating to the navigation of the single user during the transaction;
      storing information returned to the single user by the system;
      storing information selected by the single user;
   executing the transaction pattern to automatically carry out another transaction upon receiving the single user request for the transaction, including:
      retrieving the transaction pattern using at least one of an automated agent and a programmable agent;
      recognizing a state of a remote application in its interaction with the single user, the state representing, an action to be performed by the remote application;
      submitting required parameters during the other transaction;
      performing automatic navigation during the other transaction;
      retrieving the content; and
      relaying the content to the single user;
   wherein the transaction pattern further includes information submitted by the single user, in each form and in each step of a login and account access process;
   wherein the transaction pattern further includes the record of actions taken by the system which enable access of the single user to the data, and the actions enabled by the data to retrieve the content.

* * * * *

UNITED STATES PATENT AND TRADEMARK OFFICE
CERTIFICATE OF CORRECTION

| | | |
|---|---|---|
| PATENT NO. | : 7,814,020 B2 | Page 1 of 1 |
| APPLICATION NO. | : 09/942047 | |
| DATED | : October 12, 2010 | |
| INVENTOR(S) | : Khan et al. | |

It is certified that error appears in the above-identified patent and that said Letters Patent is hereby corrected as shown below:

In the specification:
    Col. 11, line 43, please replace "processing." with -- processing.. --.

In the claims:
    Col. 14, line 10, please replace "{.he" with -- the --.

Signed and Sealed this
Seventeenth Day of May, 2011

David J. Kappos
*Director of the United States Patent and Trademark Office*